(12) United States Patent
Belnap et al.

(10) Patent No.: US 10,119,340 B2
(45) Date of Patent: *Nov. 6, 2018

(54) CUTTING ELEMENTS, METHODS FOR MANUFACTURING SUCH CUTTING ELEMENTS, AND TOOLS INCORPORATING SUCH CUTTING ELEMENTS

(71) Applicant: Smith International, Inc., Houston, TX (US)

(72) Inventors: J. Daniel Belnap, Lindon, UT (US); Georgiy Voronin, Orem, UT (US); Feng Yu, Lindon, UT (US); Peter T. Cariveau, Spring, TX (US); Youhe Zhang, Spring, TX (US); Yuelin Shen, Spring, TX (US); Guodong Zhan, Spring, TX (US)

(73) Assignee: SMITH INTERNATIONAL, INC., Houston, TX (US)

( * ) Notice: Subject to any disclaimer, the term of this patent is extended or adjusted under 35 U.S.C. 154(b) by 371 days.

This patent is subject to a terminal disclaimer.

(21) Appl. No.: 14/152,065

(22) Filed: Jan. 10, 2014

(65) Prior Publication Data

US 2014/0124271 A1    May 8, 2014

Related U.S. Application Data

(60) Continuation of application No. 14/028,328, filed on Sep. 16, 2013, which is a division of application No.
(Continued)

(51) Int. Cl.
*E21B 10/55*    (2006.01)
*E21B 10/567*    (2006.01)
(Continued)

(52) U.S. Cl.
CPC ............ *E21B 10/55* (2013.01); *E21B 10/567* (2013.01); *B01J 3/062* (2013.01);
(Continued)

(58) Field of Classification Search
CPC ........ E21B 10/62; E21B 10/46; E21B 10/567; E21B 10/55; E21B 2010/561
See application file for complete search history.

(56) References Cited

U.S. PATENT DOCUMENTS

| 4,224,380 A | 9/1980 | Bovenkerk et al. |
| 5,151,107 A | 9/1992 | Cho |

(Continued)

FOREIGN PATENT DOCUMENTS

| CN | 1250481 A | 4/2000 |
| CN | 2846705 | 12/2006 |

(Continued)

OTHER PUBLICATIONS

D29 PCD Analysis, Internal Report summarizing analysis of prior art cutter; dated Aug. 2015, 18 pages.
(Continued)

*Primary Examiner* — D. Andrews
*Assistant Examiner* — Kristyn A Hall

(57) ABSTRACT

The present disclosure relates to cutting elements incorporating polycrystalline diamond bodies used for subterranean drilling applications, and more particularly, to polycrystalline diamond bodies having a high diamond content which are configured to provide improved properties of thermal stability and wear resistance, while maintaining a desired degree of impact resistance, when compared to prior polycrystalline diamond bodies. In various embodiments disclosed herein, a cutting element with high diamond content
(Continued)

includes a modified PCD structure and/or a modified interface (between the PCD body and a substrate), to provide superior performance.

19 Claims, 15 Drawing Sheets

Related U.S. Application Data

12/784,460, filed on May 20, 2010, now Pat. No. 8,567,531.

(60) Provisional application No. 61/180,059, filed on May 20, 2009, provisional application No. 61/322,149, filed on Apr. 8, 2010.

(51) Int. Cl.
| | |
|---|---|
| *B01J 3/06* | (2006.01) |
| *B22F 5/00* | (2006.01) |
| *C22C 26/00* | (2006.01) |
| *E21B 10/573* | (2006.01) |
| *B24D 3/10* | (2006.01) |

(52) U.S. Cl.
CPC .. *B01J 2203/062* (2013.01); *B01J 2203/0655* (2013.01); *B01J 2203/0685* (2013.01); *B22F 2005/001* (2013.01); *B22F 2998/10* (2013.01); *B22F 2999/00* (2013.01); *B24D 3/10* (2013.01); *C22C 26/00* (2013.01); *C22C 2026/006* (2013.01); *E21B 10/5735* (2013.01)

(56) References Cited

U.S. PATENT DOCUMENTS

| | | | |
|---|---|---|---|
| 5,238,074 A | 8/1993 | Tibbitts et al. | |
| 5,304,342 A | 4/1994 | Hall, Jr. et al. | |
| 5,589,268 A | 12/1996 | Kelley et al. | |
| 5,605,198 A * | 2/1997 | Tibbitts | E21B 10/43 |
| | | | 175/432 |
| 5,645,617 A | 7/1997 | Frushour | |
| 6,041,875 A | 3/2000 | Rai et al. | |
| 6,513,608 B2 | 2/2003 | Eyre et al. | |
| 6,544,308 B2 | 4/2003 | Griffin et al. | |
| 6,601,662 B2 | 8/2003 | Matthias et al. | |
| 6,620,375 B1 | 9/2003 | Tank | |
| 6,962,218 B2 | 11/2005 | Eyre | |
| 7,287,610 B2 | 10/2007 | Svendsen et al. | |
| 7,350,601 B2 | 4/2008 | Belnap et al. | |
| 7,493,973 B2 | 2/2009 | Keshavan | |
| 7,517,589 B2 | 4/2009 | Eyre | |
| 7,568,534 B2 | 8/2009 | Griffin et al. | |
| 7,604,074 B2 | 10/2009 | Eyre et al. | |
| 7,845,438 B1 | 12/2010 | Vail et al. | |
| 2004/0141865 A1 | 7/2004 | Keshavan et al. | |
| 2006/0081402 A1 | 4/2006 | Lockwood et al. | |
| 2006/0162969 A1* | 7/2006 | Belnap | B22F 7/06 |
| | | | 175/433 |
| 2006/0236616 A1 | 10/2006 | Wan | |
| 2006/0266559 A1 | 11/2006 | Keshavan et al. | |
| 2007/0056778 A1 | 3/2007 | Webb et al. | |
| 2007/0181348 A1 | 8/2007 | Lancaster et al. | |
| 2007/0284152 A1 | 12/2007 | Eyre et al. | |
| 2008/0066388 A1 | 3/2008 | Kuroda | |
| 2008/0179109 A1 | 7/2008 | Belnap et al. | |
| 2008/0223623 A1 | 9/2008 | Keshavan et al. | |
| 2008/0230280 A1 | 9/2008 | Keshavan et al. | |
| 2008/0302579 A1 | 12/2008 | Keshavan et al. | |
| 2009/0090563 A1 | 4/2009 | Voronin et al. | |
| 2009/0139150 A1 | 6/2009 | Ras | |
| 2009/0152018 A1 | 6/2009 | Sani | |
| 2009/0173015 A1 | 7/2009 | Keshavan | |
| 2009/0260895 A1 | 10/2009 | Vail et al. | |
| 2010/0005729 A1 | 1/2010 | Zhan | |
| 2010/0294571 A1 | 11/2010 | Belnap et al. | |
| 2010/0307070 A1 | 12/2010 | Bertagnolli et al. | |
| 2011/0042148 A1 | 2/2011 | Schmitz | |
| 2011/0042149 A1 | 2/2011 | Scott | |
| 2012/0241226 A1 | 9/2012 | Bertagnolli | |

FOREIGN PATENT DOCUMENTS

| | | |
|---|---|---|
| EP | 0706981 A2 | 4/1996 |
| GB | 2398797 A | 9/2004 |
| GB | 2438073 A | 11/2007 |
| JP | 2006528084 A | 12/2006 |
| WO | 2013040292 A2 | 3/2013 |
| ZA | 200003284 B | 1/2001 |

OTHER PUBLICATIONS

International Search Report and Written Opinion issued in International application PCT/US2010/035686 dated Jan. 4, 2011. 6 pages.
International Preliminary Report on Patentability issued in International application PCT/US2010/035686 dated Nov. 22, 2011. 4 pages.
Examiner's Report issued in Canadian Patent Application 2760984 dated Jul. 20, 2015. 3 pages.
Examinees Report issued in Canadian Patent Application 2760984 dated Apr. 21, 2016. 3 pages.
Examiner's Report issued in Canadian Patent Application 2760984 dated Feb. 8, 2017. 3 pages.
First Office Action and Search Report issued in Chinese Patent Application 201080028742.5 dated Aug. 2, 2013. English Translation. 7 pages.
Second Office Action issued in Chinese Patent Application 201080028742.5 dated Mar. 19, 2014. with English Translation. 8 pages.
First Office Action and Search Report issued in Chinese Patent Application 201410652449.6 dated Apr. 13, 2016. with English Translation. 7 pages.
Second Office Action and Search Report issued in Chinese Patent Application 201410652449.6 dated Feb. 24, 2017. with English Translation. 7 pages.
Search Report Rule 62 EPC issued in European Patent Application 10778440.7 dated Sep. 30, 2016. 7 pages.
Non-Final Rejection issued in Korean Patent Application 10-2011-7030423 dated Apr. 1, 2016. 3 pages.

* cited by examiner

CUTTING ELEMENTS, METHODS FOR MANUFACTURING SUCH CUTTING ELEMENTS, AND TOOLS INCORPORATING SUCH CUTTING ELEMENTS

CROSS-REFERENCE TO RELATED APPLICATION(S)

This application is a continuation application of U.S. patent application Ser. No. 14/028,328 filed on Sep. 16, 2013, which is a divisional application of U.S. patent application Ser. No. 12/784,460 filed on May 20, 2010, which claims priority to and the benefit of U.S. Provisional Patent Application No. 61/180,059 filed on May 20, 2009 and U.S. Provisional Patent Application No. 61/322,149 filed on Apr. 8, 2010, the entire contents of which are incorporated herein by reference.

FIELD OF THE INVENTION

The present disclosure relates to cutting elements incorporating polycrystalline diamond bodies used for subterranean drilling applications, and more particularly, to polycrystalline diamond bodies having a high diamond content which are configured to provide improved properties of thermal stability and wear resistance, while maintaining a desired degree of impact resistance, when compared to prior polycrystalline diamond bodies.

BACKGROUND

Polycrystalline diamond (PCD) materials known in the art are formed from diamond grains (or crystals) and a catalyst material which are subjected to high pressure and high temperature conditions ("HPHT sintering process"). Such PCD materials are known for having a high degree of wear resistance, making them a popular material choice for use in such industrial applications as cutting tools for machining and wear and cutting elements in subterranean mining and drilling, where such high degree of wear resistance is desired. In such applications, conventional PCD materials can be provided in the form of a surface layer or body to impart desired levels of wear resistance to a cutting tool.

Traditionally, PCD cutting elements include a substrate and a PCD body or layer attached thereto. Substrates used in such cutting element applications include carbides such as a cemented tungsten carbide (e.g., WC—Co). Such conventional PCD bodies utilize a catalyst material to facilitate intercrystalline bonding between the diamond grains and to bond the PCD body to the underlying substrate. Metals conventionally employed as the catalyst are often selected from the group of solvent metal catalysts including cobalt, iron, nickel, combinations, and alloys thereof.

The amount of catalyst material used to form the PCD body represents a compromise between desired properties of strength/toughness/impact resistance and hardness/wear resistance/thermal stability. While a higher metal catalyst content typically increases the strength, toughness and impact resistance of a resulting PCD body, such higher metal catalyst content also decreases the hardness and corresponding wear resistance as well as the thermal stability of the PCD body. Thus, these inversely affected properties ultimately limit the ability to provide PCD bodies having desired levels of hardness, wear resistance, thermal stability, strength, impact resistance, and toughness to meet the service demands of particular applications, such as cutting and/or wear elements used in subterranean drilling devices.

A particularly desired property of PCD bodies used for certain applications is improved thermal stability during wear or cutting operations. A problem known to exist with conventional PCD bodies is that they are vulnerable to thermal degradation when exposed to elevated temperature cutting and/or wear applications. This vulnerability results from the differential that exists between the thermal expansion characteristics of the solvent metal catalyst material disposed interstitially within the PCD body and the thermal expansion characteristics of the intercrystalline bonded diamond. Such differential thermal expansion is known to start at temperatures as low as 400° C., and can induce thermal stresses that can be detrimental to the intercrystalline bonding of diamond and eventually result in the formation of cracks that can make the PCD structure vulnerable to failure. Accordingly, such behavior is not desirable.

Another form of thermal degradation known to exist with conventional PCD materials is one that is also related to the presence of the solvent metal catalyst in the interstitial regions of the PCD body and the adherence of the solvent metal catalyst to the diamond crystals. Specifically, the solvent metal catalyst is known to cause an undesired catalyzed phase transformation in diamond (converting it to carbon monoxide, carbon dioxide, or graphite) with increasing temperature, thereby limiting practical use of the PCD body to about 750° C.

Thermal degradation can lead to chipping, spalling, partial fracturing, and/or exfoliation of the PCD body. These problems can be caused by the formation of micro-cracks within the PCD body followed by propagation of the crack across the PCD body. Micro-cracks can form from thermal stresses occurring within the PCD body.

U.S. Pat. No. 6,601,662 ("the x662 patent") relates to cutting elements comprising a PCD body with improved wear resistance and methods of manufacturing such cutting elements. The cutting elements described have a PCD body having a diamond volume density of greater than 85% and contain an interstitial matrix in the PCD body adjacent to a working surface which is substantially free of the catalyzing material. The '662 patent teaches that in order to achieve a sufficient level of wear resistance, increasing the volume density of diamond leads to a reduction in the depth of interstitial matrix which is substantially free of catalyzing material.

U.S. Pat. No. 7,493,973 ("the '973 patent") relates to cutting elements comprising a PCD body with a high diamond content which is treated to provide improved properties of abrasion resistance and thermal stability, while maintaining a desired degree of impact resistance. The high diamond content is obtained using coarse-sized diamond grains, such as diamond grains having an average particle size of about 0.03 mm or greater. The '973 patent also teaches that the diamond volume content of the region of the PCD body to be treated (rendered substantially free of catalyst material) will impact the depth of treatment needed to obtain a desired level of performance such as wear resistance. In particular, the '973 patent teaches that for a diamond content of greater than about 93% by volume (% v), the average depth of treatment is less than about 0.08 mm (millimeters) (80 microns/micrometers) and for a diamond content of at least about 95% by volume (% v), the average depth of treatment is at most about 0.03 mm (30 microns).

Although much work has been done with respect to the PCD body used to form a cutting element, it is still desirable that a PCD body be developed that displays even greater improvements in properties such as wear resistance and thermal stability while not sacrificing desired strength, toughness or impact resistance, especially for difficult drilling applications. Examples of difficult drilling applications include abrasive sandstones such as those found in the East Texas Basin and geothermal applications.

SUMMARY

The present disclosure relates to cutting elements incorporating polycrystalline diamond bodies used for subterranean drilling applications, and more particularly, to polycrystalline diamond bodies having a high diamond content which are configured to provide improved properties of thermal stability and wear resistance, while maintaining a desired degree of impact resistance, when compared to prior polycrystalline diamond bodies. In various embodiments disclosed herein, a cutting element with high diamond content includes a modified PCD structure and/or a modified interface (between the PCD body and a substrate), to provide superior performance.

In one embodiment, a cutting element includes a polycrystalline diamond body comprising: an interface surface; a top surface opposite the interface surface; a cutting edge meeting the top surface; and a material microstructure comprising a plurality of bonded-together diamond crystals and interstitial regions between the diamond crystals. A first region of the microstructure proximate the cutting edge comprises a plurality of the interstitial regions that are substantially free of a catalyst material, and the first region extends from the cutting edge to a depth of at least 300 microns. A second region of the microstructure proximate the interface surface comprises a plurality of the interstitial regions comprising the catalyst material disposed therewithin. The first region comprises a sintered average grain size less than 25 microns. The first region has at least one of the following properties: an apparent porosity less than $(0.1051) \cdot $(the average grain size $^{-0.3737}$); or a leached weight loss less than $(0.251) \cdot $(the average grain size $^{-0.2691}$); or a diamond volume fraction greater than $(0.9077) \cdot $(the average grain size $^{0.0221}$), with the average grain size provided in microns.

In one embodiment, a cutting element comprises a polycrystalline diamond body comprising an interface surface; a top surface opposite the interface surface; a cutting edge meeting the top surface; and a material microstructure comprising a plurality of bonded-together diamond crystals and interstitial regions between the diamond crystals. A first layer of the microstructure proximate the cutting edge comprises a first diamond volume fraction, and a second layer of the microstructure proximate the interface surface comprises a second diamond volume fraction that is at least approximately 2% less than the first diamond volume fraction. The first layer has at least one of the following properties: an apparent porosity less than $(0.1051) \cdot $(the average grain size $^{-0.3737}$); or a leached weight loss less than $(0.251) \cdot $(the average grain size $^{-0.2691}$); or the first diamond volume fraction is greater than $(0.9077) \cdot $(the average grain size $^{0.0221}$), with the average grain size provided in microns.

In one embodiment, a cutting element includes a polycrystalline diamond body comprising: an interface surface; a top surface opposite the interface surface; a cutting edge meeting the top surface; and a material microstructure comprising a plurality of bonded-together diamond crystals and interstitial regions between the diamond crystals. A first region of the microstructure proximate the cutting edge comprises a plurality of the interstitial regions that are substantially free of a catalyst material. The interface surface comprises a protrusion ratio of less than 0.7. The first region comprises a sintered average grain size less than 25 microns, and at least one of the following properties: an apparent porosity less than $(0.1051) \cdot $(the average grain size $^{-0.3737}$); or a leached weight loss less than $(0.251) \cdot $(the average grain size $^{-0.2691}$); or a diamond volume fraction greater than $(0.9077) \cdot $(the average grain size $^{0.0221}$), with the average grain size provided in microns.

In one embodiment, a cutting element includes a substrate having an interface surface, wherein the substrate comprises a cobalt content less than approximately 11% by weight; and a polycrystalline diamond body formed over the interface surface of the substrate. The polycrystalline diamond body comprises an interface surface; a top surface opposite the interface surface; a cutting edge meeting the top surface; and a material microstructure comprising a plurality of bonded-together diamond crystals and interstitial regions between the diamond crystals. A portion of the polycrystalline diamond body has at least one of the following properties: an apparent porosity less than $(0.1051) \cdot $(the average grain size $^{-0.3737}$), or a leached weight loss less than $(0.251) \cdot $(the average grain size $^{-0.2691}$), or a diamond volume fraction greater than $(0.9077) \cdot $(the average grain size $^{0.0221}$), with the average grain size provided in microns.

In one embodiment, a cutting element comprises a polycrystalline diamond body sintered at a sintering cold cell pressure greater than 5.4 GPa, the polycrystalline diamond body comprising: an interface surface; a top surface opposite the interface surface; a cutting edge meeting the top surface; and a material microstructure comprising a plurality of bonded-together diamond crystals and interstitial regions between the diamond crystals. A first region of the microstructure proximate the cutting edge comprises a plurality of the interstitial regions that are substantially free of a catalyst material, and the first region extends from the cutting edge to a depth of at least 300 microns. A second region of the microstructure proximate the interface surface comprises a plurality of the interstitial regions comprising the catalyst material disposed therewithin. The first region comprises a sintered average grain size less than 25 microns, and a diamond volume fraction greater than 92%.

In one embodiment, a cutting element comprises a polycrystalline diamond body comprising: an interface surface; a top surface opposite the interface surface; a cutting edge meeting the top surface; and a material microstructure comprising a plurality of bonded-together diamond crystals and interstitial regions between the diamond crystals. A first region of the microstructure proximate the cutting edge comprises a plurality of the interstitial regions that are substantially free of a catalyst material, and the first region extends from the cutting edge to a depth of at least 300 microns. A second region of the microstructure proximate the interface surface comprises a plurality of the interstitial regions comprising the catalyst material disposed therewithin. The first region satisfies one of the following conditions: a sintered average grain size within the range of 2-4 microns, and a diamond volume fraction greater than 93%, or a sintered average grain size within the range of 4-6 microns, and a diamond volume fraction greater than 94%, or a sintered average grain size within the range of 6-8 microns, and a diamond volume fraction greater than 95%, or a sintered average grain size within the range of 8-10 microns, and a diamond volume fraction greater than 95.5%, or a sintered average grain size within the range of 10-12 microns, and a diamond volume fraction greater than 96%.

In one embodiment, a method of forming a polycrystalline diamond cutting element with high diamond content, comprises providing a catalyst material and a plurality of diamond particles; subjecting the catalyst material and the diamond particles to a high temperature and high pressure process, comprising applying a cold cell pressure within the range of approximately 5.4 GPa to 6.3 GPa and a temperature within the range of approximately 1400 to 1500° C., thereby forming a polycrystalline diamond body comprising a plurality of bonded-together diamond crystals and interstitial regions between the diamond crystals, and comprising a cutting edge; and removing the catalyst material from a first region of the diamond body proximate the cutting edge to render a plurality of the interstitial regions in the first region substantially empty, the first region extending to a depth of at least 300 microns from the cutting edge.

In one embodiment, a method of forming a polycrystalline diamond cutting element with high diamond content, comprises providing a first diamond mixture; providing a second diamond mixture; subjecting the first and second diamond mixtures to a high temperature and high pressure process in the presence of a catalyst material, such high temperature and high pressure process comprising applying a cold cell pressure within the range of approximately 5.4 to 6.3 GPa and a temperature within the range of approximately 1400 to 1500° C., thereby forming a polycrystalline diamond body comprising a first layer formed from the first diamond mixture and a second layer formed from the second diamond mixture, each layer comprising a plurality of bonded-together diamond crystals and interstitial regions between the diamond crystals. The first layer forms at least a portion of the cutting edge of the diamond body and has a first diamond volume fraction, and the second layer forms at least a portion of an interface surface of the diamond body and has a second diamond volume fraction that is at least approximately 2% less than the first diamond volume fraction. The first layer comprises a sintered average grain size less than 25 microns, and the first layer has at least one of the following properties: an apparent porosity less than $(0.1051) \cdot$(the average grain size $\char`\^{}-0.3737$), or a leached weight loss less than $(0.251) \cdot$(the average grain size $\char`\^{}-0.2691$), or the first diamond volume fraction is greater than $(0.9077) \cdot$(the average grain size $\char`\^{} 0.0221$), with the average grain size provided in microns.

In one embodiment, a method of forming a polycrystalline diamond cutting element with high diamond content, comprises providing a plurality of diamond particles and a substrate material having a cobalt content of less than approximately 11% by weight; subjecting the diamond particles and the substrate material to a high temperature and high pressure process, comprising applying a cold cell pressure within the range of approximately 5.4 to 6.3 GPa and a temperature within the range of approximately 1400 to 1500° C., thereby forming a polycrystalline diamond body comprising a plurality of bonded-together diamond crystals and interstitial regions between the diamond crystals. At least a portion of the polycrystalline diamond body comprises a sintered average grain size less than 25 microns, and the portion of polycrystalline diamond body has at least one of the following properties: an apparent porosity less than $(0.1051) \cdot$(the average grain size $\char`\^{}-0.3737$), or a leached weight loss less than $(0.251) \cdot$(the average grain size $\char`\^{}-0.2691$), or the first diamond volume fraction is greater than $(0.9077) \cdot$(the average grain size $\char`\^{} 0.0221$), with the average grain size provided in microns.

DETAILED DESCRIPTION

Figure 1:
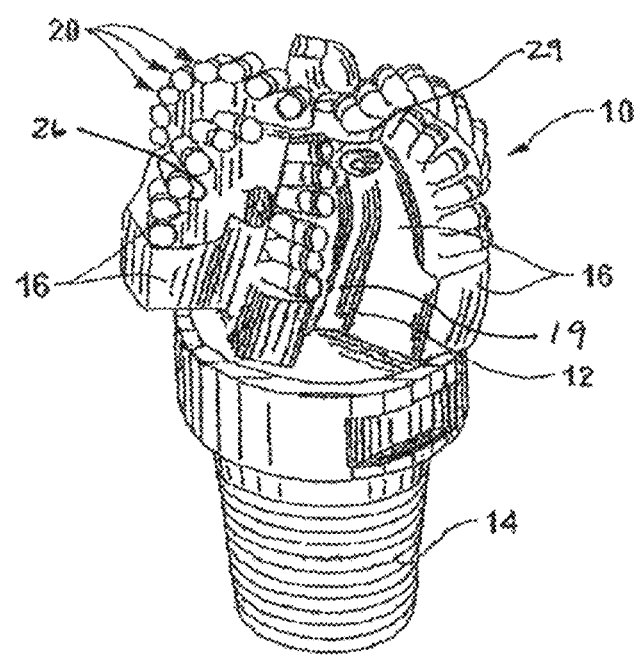
FIG. 1 is a perspective view of a drill bit incorporating a plurality of cutting elements according to an embodiment of the present disclosure.

The present disclosure relates to cutting elements comprising a polycrystalline diamond (PCD) body having a high diamond content and improved thermal characteristics. In various embodiments disclosed herein, a cutting element with high diamond content includes a modified PCD structure and/or a modified interface (between the PCD body and a substrate), to provide superior performance.

The following disclosure is directed to various embodiments of the invention. The embodiments disclosed have broad application, and the discussion of any embodiment is meant only to be exemplary of that embodiment, and not intended to intimate that the scope of the disclosure, including the claims, is limited to that embodiment or to the features of that embodiment.

Certain terms are used throughout the following description and claims to refer to particular features or components. As one skilled in the art would appreciate, different persons may refer to the same feature or component by different names. This document does not intend to distinguish between components or features that differ in name only. The drawing figures are not necessarily to scale. Certain features and components herein may be shown exaggerated in scale or in somewhat schematic form and some details of conventional elements may not be shown in the interest of clarity and conciseness.

In the following description and in the claims, the terms "including" and "comprising" are used in an open-ended fashion, and thus, should be interpreted to mean "including, but not limited to . . . ."

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, quantities, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of 1 to 4.5 should be interpreted to include not only the explicitly recited limits of 1 to 4.5, but also include individual numerals such as 2, 3, 4, and sub-ranges such as 1 to 3, 2 to 4, etc. The same principle applies to ranges reciting only one numerical value, such as "at most 4.5", which should be interpreted to include all of the above-recited values and ranges. Further, such an interpretation should apply regardless of the breadth of the range or the characteristic being described.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

When using the term "different" in reference to materials used, it is to be understood that this includes materials that generally include the same constituents, but may include different proportions of the constituents and/or that may include differently sized constituents, wherein one or both operate to provide a different mechanical and/or thermal property in the material. The use of the terms "different" or "differ", in general, are not meant to include typical variations in manufacturing.

Referring to FIG. 1, a drill bit 10, specifically a fixed cutter drill bit, is shown. The drill bit 10 includes a bit body 12, which may be formed of a matrix material, such as a tungsten carbide powder infiltrated with an alloy binder material, or may be a machined steel body. The bit body 12 includes a threaded connection 14 at one end for coupling the bit 10 to a drilling string assembly (not shown). The bit body 12 also includes a bit face 29 having a cutting element support structure disposed thereon which, in this example, comprises a plurality of blades 16 extending from the surface of the bit body. Each of the blades 16 includes a plurality of cutter pockets 26 formed therein along the periphery to accept and support a cutting element 20 positioned therein. Drilling fluid flow courses 19 are disposed between adjacent blades.

Figure 2:
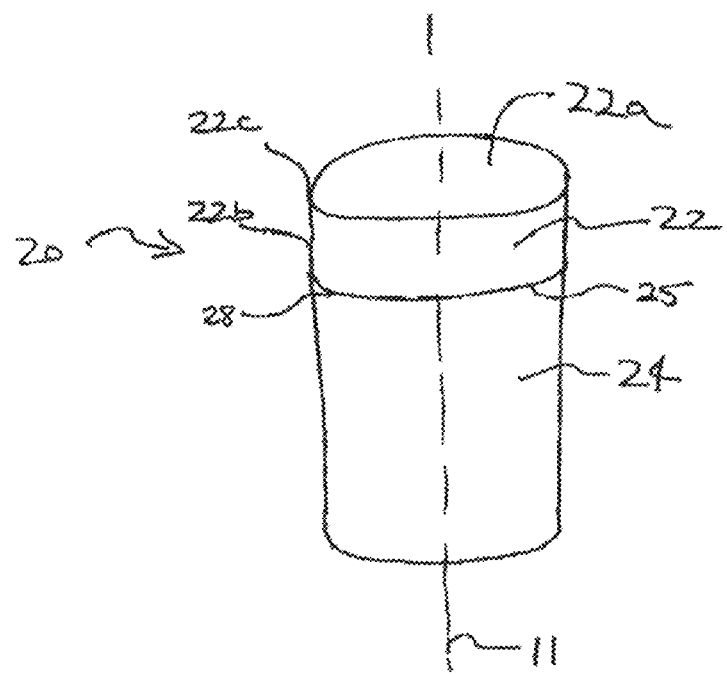
FIG. 2 is a perspective view of a cutting element including a PCD body and a substrate according to an embodiment of the present disclosure.

The cutting elements 20 may include polycrystalline diamond compact cutting elements, which may also be referred to as "PCD cutters", "shear cutters" or "cutters" 20. A perspective view of a cutting element 20 is shown, for example, in FIG. 2. Referring to FIG. 2, a PCD body 22 is bonded to a substrate material 24 to form the cutting element 20. The PCD body 22 has an upper surface 22a and a side surface 22b. The upper surface 22a meets the side surface 22b at a cutting edge 22c. The cutting edge is that portion of the cutting element which engages the formation during drilling. The cutting edge is illustrated in FIG. 2 as a sharp edge; however, in one or more alternative embodiments, the transition between the upper surface 22a and the side surface 22b may contain a beveled, curved, or tapered surface.

The PCD body 22 bonded to the substrate 24 is sometimes referred to as a diamond body, diamond table or abrasive layer. The PCD body 22 contains a microstructure of randomly oriented diamond crystals bonded together to form a diamond matrix phase and a plurality of interstitial regions interposed between the diamond crystals. The lower surface 25 of the PCD body 22 and the upper surface of the substrate 24 form the interface 28. The cutting element 20 has a central longitudinal axis 11. The cutting element illustrated in FIG. 2 is depicted as cylindrical; however, it is to be understood that any other shape may be suitable, such as ovoid, elliptical, etc., and these other shapes are contemplated as being within the scope of the present disclosure. In one or more other embodiments, the cutting element 20 may be used without a substrate 24. In one or more embodiments, the PCD body has an average thickness (between the lower surface 25 and the upper surface 22a) of at least 1.0 mm, suitably at least 1.5 mm, more suitably at least 2 mm, most suitably in the range of from 1.5 mm to 5 mm, for example 2.25 mm, 2.5 mm, 2.75 mm, 3 mm, 3.25 mm, 3.5 mm, or 4 mm.

Figure 3A:
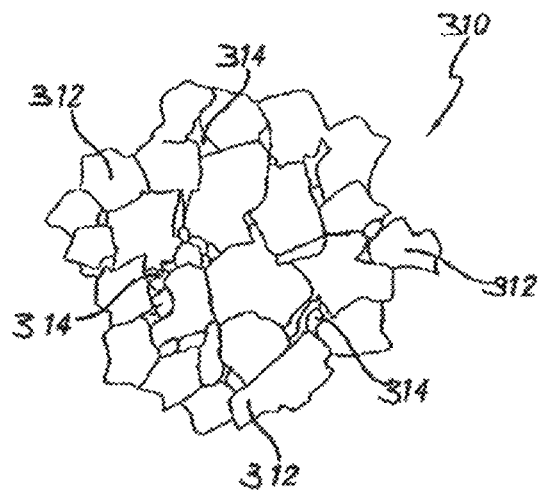
FIG. 3A is schematic representation of a region of a PCD body including a catalyst material.

FIG. 3A schematically illustrates a region 310 of a PCD body that includes a catalyst material. In particular, the region 310 comprises a plurality of bonded together diamond crystals 312, forming an intercrystalline diamond matrix first phase, and catalyst material 314 that is attached to the surfaces of the diamond crystals and/or disposed within the plurality of interstitial regions that exist between the bonded together diamond crystals (i.e., the interstitial regions are at least partially filled with catalyst material). For purposes of clarity, it is understood that the region 310 of the PCD body may be one taken within the second region of the PCD body, as described below.

Figure 3B:
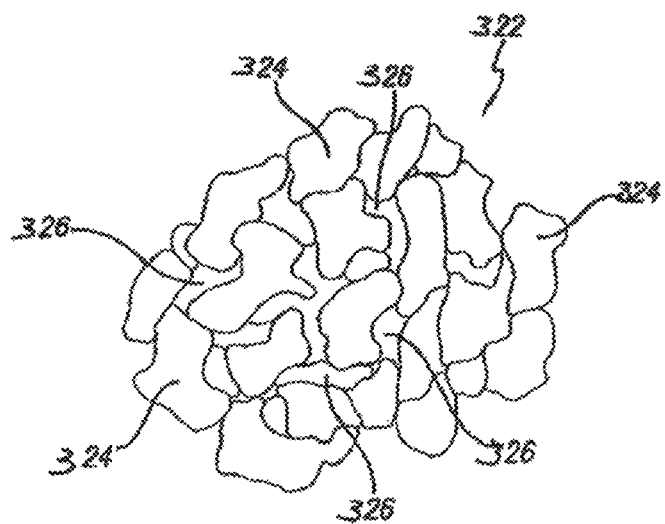
FIG. 3B is a schematic representation of a region of a PCD body that is substantially free of a catalyst material, according to an embodiment of the present disclosure.

FIG. 3B schematically illustrates a region 322 of a PCD body that is substantially free of the catalyst material. Like the PCD region 310 illustrated in FIG. 3A, the region 322 includes a material microstructure comprising a plurality of bonded together diamond crystals 324, forming the intercrystalline diamond matrix first phase. Unlike the region 310 illustrated in FIG. 3A, this region 322 of the PCD body has been treated to remove the catalyst material from the plurality of interstitial regions and, thus, comprises a plurality of interstitial regions 326 that are substantially free of the catalyst material, i.e., substantially empty voids (pores). At least a portion of the pores may be interconnected. For the purposes of clarity, it is understood that the region 322 of the PCD body may be one taken within the first region of the PCD body after a treatment process, as described below.

The term "filled", as used herein to refer to the presence of the catalyst material contained in the interstitial regions of the PCD body, is understood to mean that substantially all of the volume of the interstitial regions (voids/pores) contain the catalyst material (and tungsten carbide, and/or trace amounts of other elements such as refractory materials, including Nb, Ta, and Mo that may infiltrate into the PCD; these materials typically react with carbon to form carbides). Also, tungsten carbide and/or trace amounts of Fe or Cr may be present as a byproduct of diamond powder processing. However it is to be understood that there may also be a volume of interstitial regions within the same region of the PCD body that do not contain the catalyst material, and that the extent to which the catalyst material effectively fills the voids or pores will depend on such factors as the particular microstructure of the PCD body, the effectiveness of the process used for introducing the catalyst material, removal of absorbed gases from the surfaces of the diamond powders, and the desired mechanical and/or thermal properties of the resulting PCD body.

In one embodiment, a PCD body with high diamond content is provided. PCD with high diamond content may be characterized as PCD with a high diamond volume fraction (DVF). The diamond volume fraction refers to the ratio by volume of diamond to the overall volume of the PCD region of interest (i.e., a portion of the PCD body (e.g., first or second regions) or the entire PCD body). High diamond content can also be characterized by the apparent porosity of the PCD sample, and the leaching weight loss, as described below.

Figure 11:
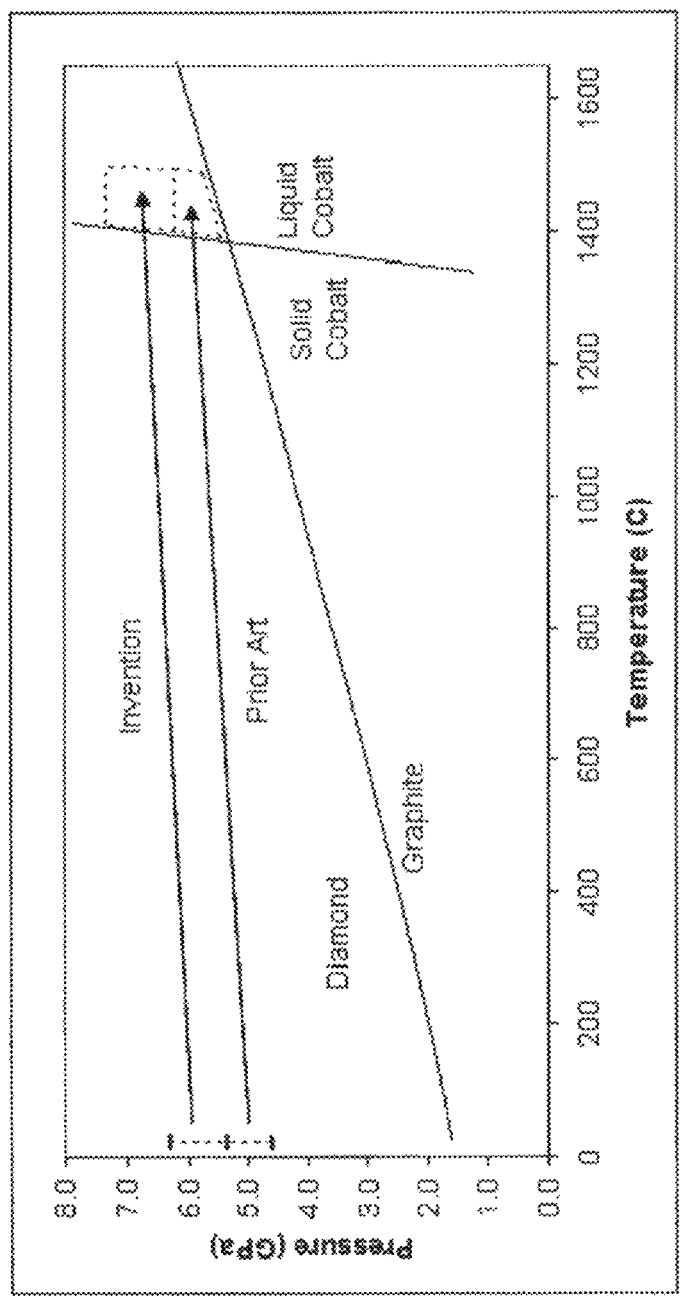
FIG. 11 is a diagram of pressure (in GPa) versus temperature (in ° C.), showing the formation of diamond at various pressures and temperatures.

In one embodiment, PCD with high diamond content is formed by HPHT sintering at higher than normal pressures, as shown for example in FIG. 11. FIG. 11 shows a diagram of the pressures and temperatures used to create PCD (as is known in the art) and PCD with high diamond content (according to embodiments of the present disclosure). The diagram includes two lines dividing the diagram into four quadrants. The more horizontal line is the diamond/graphite equilibrium line, which is well known to those skilled in the art as the Berman-Simon line. Diamond is thermodynamically stable at pressures above this line. The more vertical line is the Co—C eutectic line, adopted from FIG. 16.7 of Field's well known reference book Properties of Diamond, Academic Press, 1979. At temperatures to the right of this line, cobalt is liquid in form, and at temperatures to the left, it is in solid form. In industrial practice, diamond is formed in the top right quadrant, above the diamond/graphite line and to the right of the cobalt line.

As indicated in FIG. 11, standard HPHT pressures used to create PCD are internal cold (room temperature) cell pressures in the range of approximately 4.6 to 5.4 GPa (gigapascals) (measured by the manganin resistance method, calibrated with bismuth and ytterbium transitions, a technique well known in the industry). This pressure range becomes approximately 5.5 to 6.2 GPa as temperatures are increased beyond the cobalt line, due to thermal expansion of the cell materials. The effect of temperature on cell pressure can be assessed using techniques known in the industry, such as the melting point of gold. The lower pressure limit is determined by the diamond/graphite line of the phase diagram.

In accordance with embodiments of the present disclosure, the higher pressures used to create PCD with high diamond content are approximately 5.4 GPa to 6.3 GPa (cold cell pressures), which correspond to approximately 6.2 GPa to 7.1 GPa as temperatures are increased past the cobalt/carbon eutectic line. In exemplary embodiments, the pressure (at high temperature) is in the range of approximately 6.2 to 7.2 GPa. In various embodiments, the cell pressure (at high temperature) may be greater than 6.2 GPa, for example in the range of from greater than 6.2 GPa to 8 GPa or from 6.3 GPa to 7.4 GPa, such as 6.25 GPa, 6.35 GPa, 6.4 GPa, 6.45 GPa, 6.5 GPa, 6.6 GPa, or 6.7 GPa.

The temperatures used in both standard HPHT sintering and the higher pressure HPHT sintering used to create high diamond content are similar, ranging from approximately 1400° C. to 1450° C. Temperatures may be slightly higher for high diamond content HPHT sintering than for standard HPHT sintering. Suitably, the temperatures used during the high pressure HPHT sintering process may be in the range of from 1350° C. to 1500° C., for example 1400° C. to 1500° C., or for example from 1400° C. to 1450° C. Temperatures typically are kept around 1450° C. or below, and are not raised much beyond 1500° C., due to the resulting reactions in the surrounding cell materials (niobium/tantalum reactions and salt-NaCl melt).

After the HPHT sintering process is completed, the assembly may be removed from the HPHT device (e.g., a cubic press, a belt press, a torroid press, etc.) and the cutting element removed from the assembly. The PCD body may be formed without using a substrate if desired.

The mixture of diamond grains (natural or synthetic) and catalyst material may be subjected to sufficient HPHT conditions for a pre-determined period of time to sinter the diamond crystals forming the polycrystalline diamond body, as described herein, and optionally, to bond the polycrystalline diamond body to a substrate. Suitable internal cold cell pressures required to obtain a given diamond content, catalyst content, and density depend on several factors such as the amount and type of catalyst present as well as the particle size and distribution of the diamond crystals used to form the PCD body, and the addition of graphite (whether by directly adding graphite to the diamond mixture or by graphitizing the diamond crystals in the diamond mixture, as described in U.S. Patent Application No. 2008/0302579, filed Jun. 5, 2007, which description is herein incorporated by reference). In the various examples described below, no graphite was added to the powder mixtures. The diamond powders were subjected to a 1280° C. vacuum environment for 1-2 hours before sintering. No graphite was detectable by subsequent examination of the powder by Raman spectroscopy, which is well known in the art as a standard carbon phase characterization technique.

In one embodiment, a PCD body with high diamond content includes a diamond volume fraction ($v_{dia}$ or DVF) of greater than 90%, and in another embodiment greater than 91%, and in other embodiments greater than 92%, 92.5%, 93%, 94%, 95%, 95.5%, 96%, 97%, 98%, or 99%.

Three different techniques are provided herein for identifying PCD with high diamond content. First, the apparent porosity of the high-diamond-content PCD body can be determined. Second, the leaching weight loss of the PCD body can be determined. Third, the DVF of the sample can be determined. Each of these three properties, in connection with the grain size of the sintered PCD sample, can be used to identify a PCD sample as having high diamond content. Techniques for determining these three properties of a PCD sample are presented below. Additionally, PCD bodies were tested with each method to evaluate the methods and correlate results. As explained below, PCD bodies with high diamond content made in accordance with embodiments of the present disclosure can be identified by one (or more) of these three methods, based on the procedures, assumptions, and limitations described below. The methods are referred to as the (1) Apparent Porosity, (2) Weight Loss, and (3) Density methods. The apparent porosity and weight loss methods can be used to identify PCD bodies created at higher than normal pressures, without assuming or determining an amount of cobalt in the PCD body, while the density method requires determination of the cobalt to tungsten ratio in the sintered body.

The first method for assessing the diamond content of a sintered PCD body or a region or portion of the PCD body (referred to as the PCD sample) is the "Apparent Porosity" method. The apparent porosity of a sample is the percentage by volume of voids over the total volume of the sample. The apparent porosity method measures the volume of voids in the sample. PCD with high diamond content has fewer voids, as more of the volume of the sample is occupied by diamond crystals.

This method includes leaching a sintered PCD sample to remove the metal catalyst in the interstitial regions between the diamond crystals, measuring the weight of the leached sample, and then immersing it in water and weighing again to determine the increased weight from the permeation of water into the leached interstitial regions. Based on the increase in weight from the water, the volume of the interstitial regions can be determined.

An embodiment of this method is described in more detail as follows. First, the PCD sample is leached according to the following procedure. Complete leaching is achieved in the PCD sample by placing the sample in an acid solution in a Teflon container, which is contained within a sealed stainless steel pressure vessel and heated to 160-180° C. Containers suitable for such leaching procedures are commercially available from Bergoff Products & Instruments GmbH, Eningen, Germany. It is likely that pressures of between 100-200 psi are achieved by heating under these conditions, though during the inventors' actual testing (summarized below), the pressure was not directly measured. A standard acid solution which has been found to work satisfactorily in leaching PCD material is made from reagent grade acids and comprises a concentration of approximately 5.3 mol/liter $HNO_3$ and approximately 9.6 mol/liter HF, which is made by ratio of 1:1:1 by volume of $HNO_3$—15.9 mol/liter (reagent grade nitric acid): HF—28.9 mol/liter (reagent grade hydrofluoric acid): and water.

Second, verification of the leaching process is performed by examining the leached PCD sample with penetrating x-ray radiography to confirm that the acid mixture penetrated the sample and that no macro-scale catalytic metallic regions remain. During the inventors' testing, it was found that typically a time period between 2-3 weeks in the pressure vessel was adequate to sufficiently leach the catalytic metals from the PCD sample.

Third, subsequent to leaching and verification, the sample is cleaned of residual materials such as nitrates and insoluble oxides by alternating exposure to deionized water in the pressure vessel described above (dilution of the soluble nitrates) and exposing the sample to ultrasonic energy at room temperature (removal of insoluble oxides). Repeating the cycle of high temperature/pressure deionized water/ ultrasonic energy exposure three times was found to be sufficient to adequately clean the sample.

The above procedure completes the leaching and preparation of the sample. Next, the apparent porosity method is performed according to the ASTM (American Society for Testing and Materials) C20 standard for determining apparent porosity of a sample. Specifically, after leaching and cleanup, the prepared sample is weighed to determine the leached weight ($W_L$). Next, the sample is submerged in boiling water for at least two hours to infiltrate water into the leached interstitial regions (pores) of the PCD sample. After cooling, the infiltrated, submerged sample is weighed in water to determine the leached, infiltrated, submerged weight ($W_{LIS}$). The sample is then gripped with a paper towel and removed from the water. Water remains trapped in the internal pores of the sample. The sample is then weighed to determine the leached and infiltrated weight in air ($W_{LI}$).

With these values, the apparent porosity (AP) of the sample can be determined with the following equation:

$$AP = \frac{(W_{LI} - W_L)}{(W_{LI} - W_{LIS})} \quad (1)$$

That is, the apparent porosity AP is the increase in weight of the leached sample after boiling water infiltration ($W_{LI} - W_L$) divided by the difference in weight of the leached and infiltrated sample after being submerged. This value shows the percentage by volume of empty pores in the leached sample.

As mentioned above, a PCD sample with high diamond content tends to have low apparent porosity, as a high percentage of the volume of the sample is occupied by the diamond crystals, rather than the pores between the crystals. Notably, the above method operates on the assumption that the PCD sample is fully leached, meaning that all metal content is removed from the PCD sample, leaving only diamond behind. The apparent porosity measures interconnected porosity—the increase in weight due to water infiltration into the interconnected leached pores. However, some pores are isolated and not reached by the water, or are too small or interconnected by channels that are too fine to permit entry of the water. Other pores may remain partially occupied by metal and thus will not be fully infiltrated by the water. These various un-infiltrated pores are not included in the above calculation of apparent porosity. The above method can be used to calculate the interconnected porosity of various PCD samples, and compare the porosity to identify samples with high diamond content.

Four different diamond powders were HPHT sintered at three different high pressures to form twelve PCD bodies with high diamond content for testing according to the above method. The parameters of the four diamond powder mixtures are shown below in Table 1:

TABLE I

| Mixture | Starting Grain Size (micron) | Constituent Diamond Cuts (wt %) | | | | | | | | | | | Sintering Aids (wt %) Co |
|---|---|---|---|---|---|---|---|---|---|---|---|---|---|
| | | 25~45 | 25~40 | 20~30 | 16~26 | 12~22 | 8~16 | 6~12 | 4~8 | 3~6 | 2~4 | 1~3 | |
| 1 | 25 | 14% | 24% | 12% | 15% | 24% | | | 6% | | 5% | | 2 |
| 2 | 16 | | | | 28% | 44% | 7% | | | 16% | | 5% | 2 |
| 3 | 12 | | | | | 50% | | 38% | | | 12% | | 2 |
| 4 | 5 | | | | | | | | 88% | | | 12% | 2 |

Figure 10A:
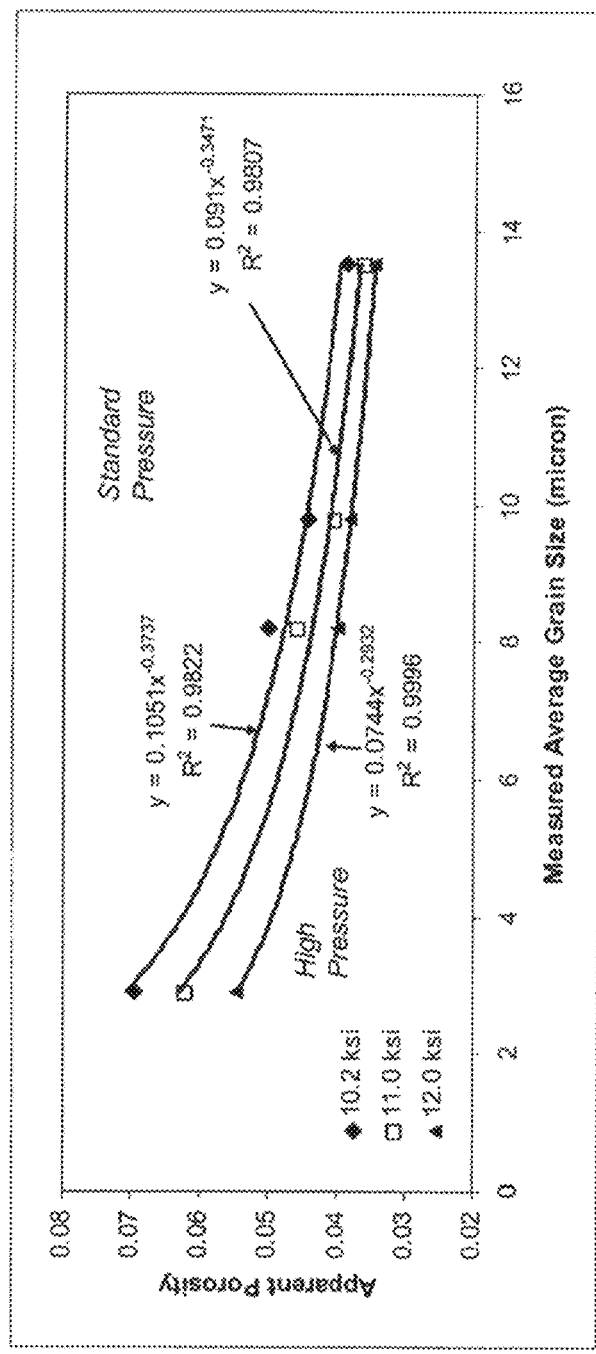
FIG. 10A is a diagram of apparent porosity versus average grain size for PCD samples sintered at three different pressures (10.2 ksi, 11.0 ksi, and 12.0 ksi).

The four powder mixtures listed above were sintered at three different high pressures (hydraulic fluid pressures of 10.2 ksi, 11 ksi, and 12 ksi) (which correlate to internal cold cell pressures of 5.4 GPa, 5.8 GPa, and 6.2 GPa, and internal hot cell pressures of 6.2 GPa, 6.7 GPa, and 7.1 GPa). These sintered PCD bodies were then tested according to the method presented above to identify the apparent porosity of the sintered PCD bodies. The results are shown in FIG. 10A. FIG. 10A shows the measured apparent porosity versus sintered average sintered grain size, for three different sintering pressures.

The average grain size of a PCD sample can be determined by an electron back scatter diffraction (EBSD) technique, as follows. A suitable surface preparation is achieved by mounting and surfacing the PCD sample using standard metallographic procedures, and then subsequently producing a mirror surface by contact with a commercially available high speed polishing apparatus (available through Coborn Engineering Company Limited, Romford, Essex, UK). The EBSD data is collected in a scanning electron microscope suitably equipped to determine grain orientation by localized diffraction of a directed electron beam (available through EDAX TSL, Draper, Utah, USA). Magnification is selected such that greater than 1000 grains were included in a single image analysis, which was typically between 500×-1000× for the grain sizes examined. During the inventors' testing, other conditions were as follows: voltage=20 kV, spot size=5, working distance=10-15 mm, tilt=70°, scan step=0.5-0.8 microns. Grain size analysis is performed by analysis of the collected data with a misorientation tolerance angle=2°. Defined grain areas determined according to the above conditions are sized according to the equivalent diameter method, which is mathematically defined as $GS = (4 A/\pi)^{1/2}$, where GS is the grain size and A is the grain area. This analysis provided the average grain size for each of the sintered PCD samples.

The powder mixtures identified above were sintered at three different pressures, and the PCD samples were tested according to the above methods to identify the apparent porosity and sintered average grain size. The resulting measurements are shown in Table II as follows:

TABLE II

| | | Apparent Porosity | | | | |
|---|---|---|---|---|---|---|
| Mixture | Pressure (ksi) | Weight Leached (gm) | Weight Leached-Infiltrated (gm) | Weight Leached-Infiltrated-Submerged (gm) | Apparent Porosity | Sintered Average Grain Size (micron) |
| 1 | 10.2 | 0.9618 | 0.9727 | 0.6898 | 0.0387 | 13.5 |
| 2 | 10.2 | 0.9899 | 1.0029 | 0.7106 | 0.0445 | 9.8 |
| 3 | 10.2 | 0.9831 | 0.9978 | 0.7059 | 0.0503 | 8.2 |
| 4 | 10.2 | 0.7133 | 0.7282 | 0.5136 | 0.0696 | 2.9 |
| 1 | 11 | 0.9508 | 0.9609 | 0.6826 | 0.0363 | 13.5 |
| 2 | 11 | 0.9775 | 0.9891 | 0.7017 | 0.0404 | 9.8 |
| 3 | 11 | 0.9542 | 0.9672 | 0.6854 | 0.0460 | 8.2 |
| 4 | 11 | 0.9597 | 0.9775 | 0.6913 | 0.0622 | 2.9 |
| 1 | 12 | 1.0096 | 1.0198 | 0.7251 | 0.0348 | 13.5 |
| 2 | 12 | 1.0103 | 1.0215 | 0.7259 | 0.0381 | 9.8 |
| 3 | 12 | 0.9893 | 1.0008 | 0.7112 | 0.0399 | 8.2 |
| 4 | 12 | 0.9585 | 0.9739 | 0.6911 | 0.0546 | 2.9 |

This data is plotted in FIG. 10A. As shown in FIG. 10A, the relationship between apparent porosity and sintered average grain size followed the same trend for the three different sintering pressures. Curve fits were applied to the data, and the resulting equations are shown on the chart for each sintering pressure. For a given grain size, increasing the sintering pressure led to a decrease in apparent porosity. This is due to the higher pressure causing additional compaction of the diamond powder, resulting in smaller voids between the sintered diamond crystals.

FIG. 10A also shows that for a given sintering pressure, increasing the average grain size leads to a decrease in apparent porosity. This result is likely due the fracturing of the larger diamond crystals during the HPHT sintering. Finer diamond crystals are more resistant to fracturing than the larger diamond crystals, which fracture and rearrange themselves under pressure, compacting and packing more effectively into the spaces between the crystals, as discussed again in more detail below.

The curve fit for the 10.2 ksi data in FIG. 10A identifies the boundary between high and standard sintering pressures. Thus, a PCD sample can be identified as having been sintered at high sintering pressure by measuring the sintered average grain size and the apparent porosity of the sample. For a given grain size, if the apparent porosity is below the 10.2 ksi line, then the sample was sintered at higher than standard sintering pressures. If the apparent porosity is above the 10.2 ksi line, then the sample was sintered at standard pressures. As mentioned above, the hydraulic fluid pressure of 10.2 ksi corresponds to an internal cold cell pressure of 5.4 GPa and a hot cell pressure of 6.2 GPa.

Accordingly, PCD with high diamond content, formed by sintering at higher than normal pressures, can be identified as follows (with average grain size in microns):

PCD with an apparent porosity less than $(0.1051) \cdot$ (the average grain size $^{-0.3737}$), or PCD with an apparent porosity less than $(0.091) \cdot$ (the average grain size $^{-0.3471}$), or PCD with an apparent porosity less than $(0.0744) \cdot$ (the average grain size $^{-0.2932}$), or PCD with an apparent porosity less than one of the following values and an average grain size within the corresponding range:

| Sintered Average Grain Size (micron) | Apparent Porosity (12 ksi) | Apparent Porosity (11 ksi) | Apparent Porosity (10.2 ksi) |
|---|---|---|---|
| 2-4 | 0.050 | 0.056 | 0.063 |
| 4-6 | 0.044 | 0.049 | 0.054 |
| 6-8 | 0.040 | 0.044 | 0.048 |
| 8-10 | 0.038 | 0.041 | 0.044 |
| 10-12 | 0.036 | 0.038 | 0.042 |

The second method for assessing the diamond content of a PCD body is referred to as the "Weight Loss" method. This method includes measuring the weight of the sample before and after leaching to determine the amount of metal removed. The ratio of the weight of metal removed by leaching to the total weight of the sample is referred to as the "leaching weight loss (%)." Optionally, additional measurements can be taken (including the mass fractions of the metal components) in order to convert the weight loss into a volume fraction and determine the metal volume fraction, as shown below.

An embodiment of this method is described in more detail as follows. Before leaching the PCD sample, the sample is weighed in air to obtain the unleached weight ($W_U$), and weighed in water to obtain the unleached, submerged weight ($W_{US}$). Next, the PCD sample is leached, leaching is verified, and the sample is cleaned according to the same steps outlined above for the Apparent Porosity method. These steps complete the leaching and preparation of the sample.

Next, the leached, cleaned sample is weighed to obtain the leached weight ($W_L$). The leaching weight loss is then calculated as follows:

$$\text{Leaching Weight Loss (\%)} = \frac{(W_U - W_L)}{W_U} \quad (2)$$

Optionally, the following calculations can be used to determine the metal volume fraction of the PCD sample, which can be used to estimate the diamond volume fraction as well:

$$\text{Metal Volume Fraction } (MVF) = \frac{\rho_S(W_U - W_L)}{\rho_M(W_U)} \quad (3)$$

where $\rho_s$ = density of the sample = $\frac{\rho_W W_U}{W_U - W_{US}}$ (4)

and $\rho_W$ = density of water = 1.00 gm/cc and $\rho_M$ = density of the metal = $\frac{\rho_{WC}\rho_{CO}(m_{CO} + m_{WC})}{m_{CO}\rho_{WC} + m_{WC}\rho_{CO}}$ (5)

and $m_{CO}$ = mass fraction of cobalt and $m_{WC}$ = mass fraction of tungsten carbide The densities of cobalt ($\rho_{CO}$) and tungsten carbide ($\rho_{WC}$) are known. Thus, to complete the equations above, the mass fractions of cobalt ($m_{CO}$) and tungsten ($m_{WC}$) must be determined. These mass fractions can be determined by analytical techniques such as energy dispersive spectroscopy (EDS), which is described in further detail below in connection with the third "Density" method.

With the above equations, diamond volume fraction may be estimated from either the Apparent Porosity or the Weight Loss methods. However it should be recognized that calculation of DVF by those techniques has inherent differences from the Density method (described below), and is not considered to be equivalent to the Density method. Calculation of DVF by the Weight Loss method relies on analytical techniques to determine the mass fractions of the metal components in the sintered PCD sample. It also relies on leaching to fully remove the metal from the PCD, so that the difference in weight can be obtained. Accordingly, this method is likely to slightly under-estimate the total metal content, as some metal content may remain in trapped pores within the PCD sample even after leaching. The same limitation applies to calculation of DVF by the Apparent Porosity method, which relies on leaching and water infiltration. Herein, references to DVF are DVF measured according to the Density method.

Accordingly, the Weight Loss method uses the leached and unleached weights of the PCD sample to determine the leaching weight loss %. The same PCD samples identified above in the Apparent Porosity method (the four diamond powder mixtures sintered at three different pressures) were tested according to the Weight Loss method to determine and compare the leaching weight loss of the samples. The resulting measurements are shown in Table III:

TABLE III

| | | Weight Loss | | | | | | |
|---|---|---|---|---|---|---|---|---|
| Mixture | Pressure (ksi) | Weight Unleached (gm) | Weight Leached (gm) | Weight Loss (gm) | Leaching Weight Loss (%) | Co wt % (EDS) | W wt % (EDS) | Sintered Average Grain Size (micron) |
| 1 | 10.2 | 1.0950 | 0.9617 | 0.1333 | 12.17% | 10.51 | 2.32 | 13.5 |
| 2 | 10.2 | 1.1222 | 0.9718 | 0.1504 | 13.40% | 11.41 | 3.12 | 9.8 |
| 3 | 10.2 | 1.1576 | 0.9843 | 0.1733 | 14.97% | 12.15 | 3.62 | 8.2 |

TABLE III-continued

Weight Loss

| Mixture | Pressure (ksi) | Weight Unleached (gm) | Weight Leached (gm) | Weight Loss (gm) | Leaching Weight Loss (%) | Co wt % (EDS) | W wt % (EDS) | Sintered Average Grain Size (micron) |
|---|---|---|---|---|---|---|---|---|
| 4 | 10.2 | 0.8885 | 0.7233 | 0.1652 | 18.59% | 15.01 | 5.29 | 2.9 |
| 1 | 11 | 1.0853 | 0.9603 | 0.1249 | 11.51% | 11.43 | 3.2 | 13.5 |
| 2 | 11 | 1.1217 | 0.9821 | 0.1396 | 12.45% | 11.54 | 3.01 | 9.8 |
| 3 | 11 | 1.1087 | 0.9541 | 0.1546 | 13.94% | 12.01 | 3.36 | 8.2 |
| 4 | 11 | 1.1603 | 0.9587 | 0.2016 | 17.37% | 14.83 | 6.28 | 2.9 |
| 1 | 12 | 1.1263 | 1.0055 | 0.1208 | 10.73% | 10.53 | 2.89 | 13.5 |
| 2 | 12 | 1.1414 | 1.0102 | 0.1311 | 11.49% | 14.42 | 5.740 | 9.8 |
| 3 | 12 | 1.1372 | 0.9926 | 0.1446 | 12.71% | 11.97 | 4.02 | 8.2 |
| 4 | 12 | 1.1307 | 0.9535 | 0.1772 | 15.67% | 16.33 | 5.24 | 2.9 |

Figure 10B:
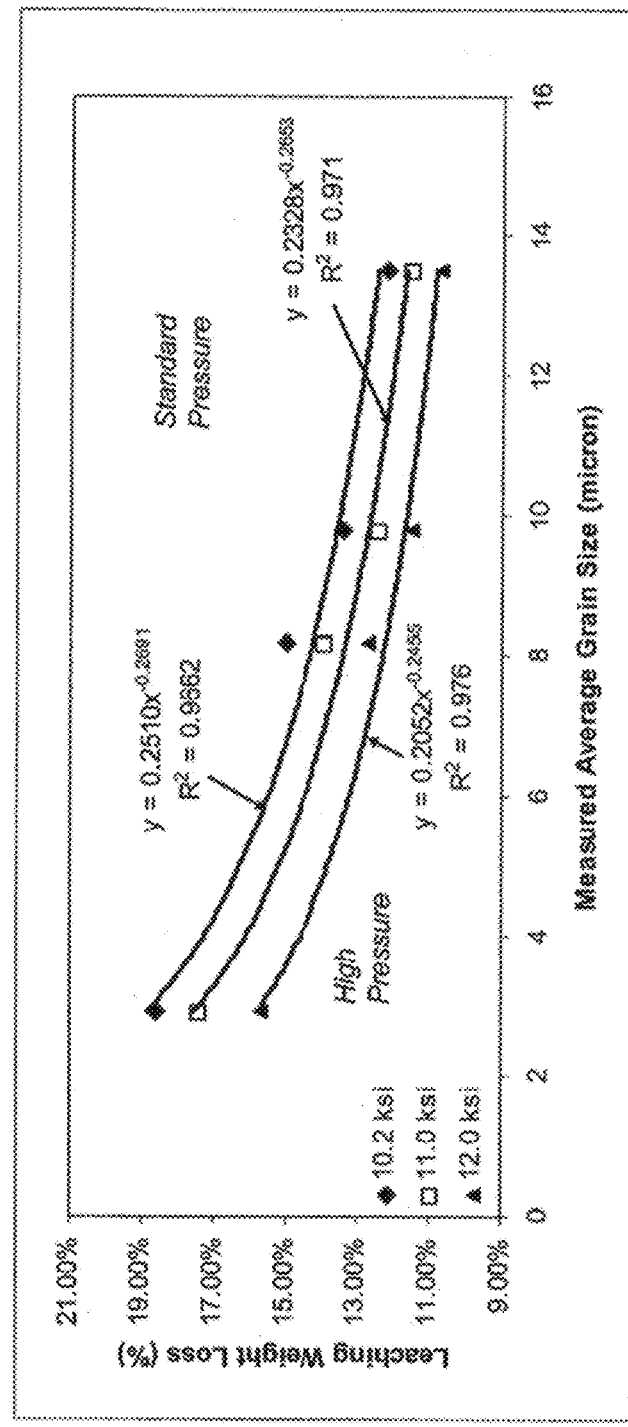
FIG. 10B is a diagram of leaching weight loss versus average grain size for PCD samples sintered at three different pressures (10.2 ksi, 11.0 ksi, and 12.0 ksi).

This data is also plotted in FIG. 10B, which shows the leaching weight loss (%) versus the measured sintered average grain size. As shown in FIG. 10B, the relationship between leaching weight loss and average grain size followed the same trend for the three different sintering pressures. Curve fits were applied to the data, and the resulting equations are shown on the chart for each sintering pressure. For a given grain size, increasing the sintering pressure led to a decrease in the leaching weight loss. This is due to the higher pressure causing additional compaction of the diamond grains, resulting in smaller voids between the sintered diamond crystals, and less metal infiltrating the voids during sintering. The lower metal content leads to a lower leaching weight loss.

FIG. 10B also shows that for a given sintering pressure, increasing the average grain size leads to a decrease in leaching weight loss. This result is likely due the fracturing of the larger diamond crystals during the HPHT sintering, as discussed above. The finer diamond crystals fracture and rearrange themselves under pressure, compacting and packing more effectively into the spaces between the crystals, leading to lower metal content infiltrating the PCD body during sintering.

The curve fit for the 10.2 ksi data in FIG. 10B identifies the boundary between high and standard sintering pressures. Thus, a PCD sample can be identified as having been sintered at high sintering pressure by measuring the average grain size and the leaching weight loss of the sample. For a given grain size, if the leaching weight loss is below the 10.2 ksi line, then the sample was sintered at higher than standard sintering pressures. If the leaching weight loss is above the 10.2 ksi line, then the sample was sintered at standard pressures.

Accordingly, PCD with high diamond content, formed by sintering at higher than normal pressures, can be identified as follows (with average grain size in microns):

PCD with a leaching weight loss less than $(0.251) \cdot (\text{the average grain size}^{-0.2691})$, or PCD with a leaching weight loss less than $(0.2328) \cdot (\text{the average grain size}^{-0.2653})$, or PCD with a leaching weight loss less than $(0.2052) \cdot (\text{the average grain size}^{-0.2455})$, or PCD with a leaching weight loss less than one of the following values and an average grain size within the corresponding range:

| Sintered Average Grain Size (micron) | Leaching Weight Loss (12 ksi) | Leaching Weight Loss (11 ksi) | Leaching Weight Loss (10.2 ksi) |
|---|---|---|---|
| 2-4 | 0.146 | 0.161 | 0.174 |
| 4-6 | 0.132 | 0.145 | 0.156 |
| 6-8 | 0.123 | 0.134 | 0.144 |
| 8-10 | 0.117 | 0.126 | 0.136 |
| 10-12 | 0.111 | 0.120 | 0.129 |

The third method for assessing the diamond content of a PCD sample is referred to as the "Density" method. This method calculates the diamond volume fraction of the PCD sample. This method does not require leaching of the PCD sample. Instead, the bulk density of the sample is measured, and the ratios of metal components and diamond are measured to determine the volume fractions of these components.

This method includes determining the component mass fractions by analytical methods. Determination of the binder composition can employ one of many techniques, including energy dispersive spectroscopy (EDS), wavelength dispersive spectroscopy (WDS), x-ray fluorescence (XRF), inductively coupled plasma (ICP), or wet chemistry techniques. Because of its frequent usage in scanning electron microscopes, EDS is commonly used to quantitatively assess PCD specimens. However, EDS may not accurately determine low atomic number elements such as carbon accurately without arduous effort, which causes problems in a material such as PCD. Despite this known limitation, if the cobalt/tungsten ratio of the binder phase is known with reasonable accuracy, then the composition can be reasonably determined if the bulk density of the sample is known.

To determine if any individual analytical method such as those mentioned above is sufficiently calibrated, analysis of a known cemented carbide sample should be performed. Sufficient accuracy is obtained if the cobalt elemental composition is within 0.5% and the tungsten elemental composition is within 1.5% (i.e. a WC-13 wt % Co should give 12.5-13.5 wt % cobalt and 80.1-83.1 wt % tungsten). More reliable EDS results on PCD samples are obtained when the sample is polished to mirror surface finish by polishing with a diamond-containing grinding surface (e.g., a grinding wheel) similar to the method subsequently described for EBSD sample preparation. A low magnification 10-100× is typically used in order to maximize the sampling region. Various working distances and accelerating voltages can be employed, however working distances of 10-11 mm and accelerating voltage of 20 kilovolts have given acceptable results. When analyzing a sample, the total time should include a live collection time of 30-60 seconds with a dead time of 25-35%. The EDS measured mass fractions may be used to determine a value for a constant k (see Equation 6 below). This constant k along with the measured density of the PCD body ($\rho_s$ above) may be used to obtain the calculated mass fractions of the diamond, catalyst and metal carbide (see Equations 7-9 below). The calculated volume fraction of diamond, catalyst and metal carbide may then be determined from the calculated mass fractions (see Equations 10-12 below).

$$k = m_{catalyst}/m_{metal\ carbide} \quad \text{(Equation 6)}$$

where: $m_{catalyst}$ is the mass fraction determined from EDX spectroscopy $m_{metal\ carbide}$ is the mass fraction of the metal component in the metal carbide determined from EDX spectroscopy For example, if the catalyst material is cobalt and the metal carbide is tungsten carbide, the following equations may be used to calculate the mass fractions of the diamond ($m_{dia}$), cobalt ($m_{co}$), and tungsten carbide ($m_{wc}$) in the PCD body:

$$m_{dia} = 1 - \frac{(\rho_{dia} - \rho)}{\rho}\left[\frac{\rho_{co}\rho_{wc}(k+1)}{\rho_{dia}\rho_{co} + \rho_{wc}\rho_{dia}k - \rho_{wc}\rho_{co}(k+1)}\right] \quad \text{(Equation 7)}$$

$$m_{co} = \frac{(\rho_{dia} - \rho)}{\rho}\left[\frac{\rho_{co}\rho_{wc}k}{\rho_{dia}\rho_{co} + \rho_{wc}\rho_{dia}k - \rho_{wc}\rho_{co}(k+1)}\right] \quad \text{(Equation 8)}$$

$$m_{wc} = \frac{(\rho_{dia} - \rho)}{\rho}\left[\frac{\rho_{co}\rho_{wc}}{\rho_{dia}\rho_{co} + \rho_{wc}\rho_{dia}k - \rho_{wc}\rho_{co}(k+1)}\right] \quad \text{(Equation 9)}$$

where:
$\rho_{dia} = 3.51\ gm/cc$
$\rho_{co} = 8.85\ gm/cc$
$\rho_{wc} = 15.7\ gm/cc$
$\rho$ = measured density of the PCD sample From the calculated mass fractions, the volume fractions may be calculated for diamond ($v_{dia}$), cobalt ($v_{co}$) and tungsten carbide ($v_{wc}$) in the PCD body using the following equations:

$$v_{dia} = \left[\frac{m_{dia}/\rho_{dia}}{m_{dia}/\rho_{dia} + m_{co}/\rho_{co} + m_{wc}/\rho_{wc}}\right] \quad \text{(Equation 10)}$$

$$v_{co} = \left[\frac{m_{co}/\rho_{co}}{m_{dia}/\rho_{dia} + m_{co}/\rho_{co} + m_{wc}/\rho_{wc}}\right] \quad \text{(Equation 11)}$$

$$v_{wc} = \left[\frac{m_{wc}/\rho_{wc}}{m_{dia}/\rho_{dia} + m_{co}/\rho_{co} + m_{wc}/\rho_{wc}}\right] \quad \text{(Equation 12)}$$

One skilled in the art would appreciate that the mass fractions and volume fractions may be determined in a similar way when using a catalyst material other than cobalt and a metal carbide other than tungsten carbide, and the above equations may be modified as appropriate if significant amounts of additional materials are present.

The same PCD samples identified above in the Apparent Porosity and Weight Loss methods (the four diamond powder mixtures sintered at three different pressures) were tested according to the Density method to determine and compare the diamond volume fraction of the samples. The resulting measurements are shown in Table IV:

TABLE IV

Density

| Mixture | Pressure (ksi) | Co wt % (EDS) | W wt % (EDS) | Co/W Ratio | Sample Density (gm/cc) | Diamond Vol Fraction | Sintered Average Grain Size (micron) |
|---|---|---|---|---|---|---|---|
| 1 | 10.2 | 10.51 | 2.32 | 4.53 | 3.874 | 0.9615 | 13.5 |
| 2 | 10.2 | 11.41 | 3.12 | 3.66 | 3.902 | 0.9559 | 9.8 |
| 3 | 10.2 | 12.15 | 3.62 | 3.36 | 3.955 | 0.9499 | 8.2 |
| 4 | 10.2 | 15.01 | 5.29 | 2.84 | 4.076 | 0.9295 | 2.9 |
| 1 | 11 | 11.43 | 3.2 | 3.57 | 3.844 | 0.9639 | 13.5 |
| 2 | 11 | 11.54 | 3.01 | 3.83 | 3.881 | 0.9587 | 9.8 |
| 3 | 11 | 12.01 | 3.36 | 3.57 | 3.930 | 0.9532 | 8.2 |
| 4 | 11 | 14.83 | 6.28 | 2.36 | 4.046 | 0.9371 | 2.9 |
| 1 | 12 | 10.53 | 2.89 | 3.64 | 3.827 | 0.9653 | 13.5 |
| 2 | 12 | 14.42 | 5.740 | 2.51 | 3.857 | 0.9619 | 9.8 |
| 3 | 12 | 11.97 | 4.02 | 2.98 | 3.907 | 0.9580 | 8.2 |
| 4 | 12 | 16.33 | 5.24 | 3.12 | 4.009 | 0.9439 | 2.9 |

Figure 10C:
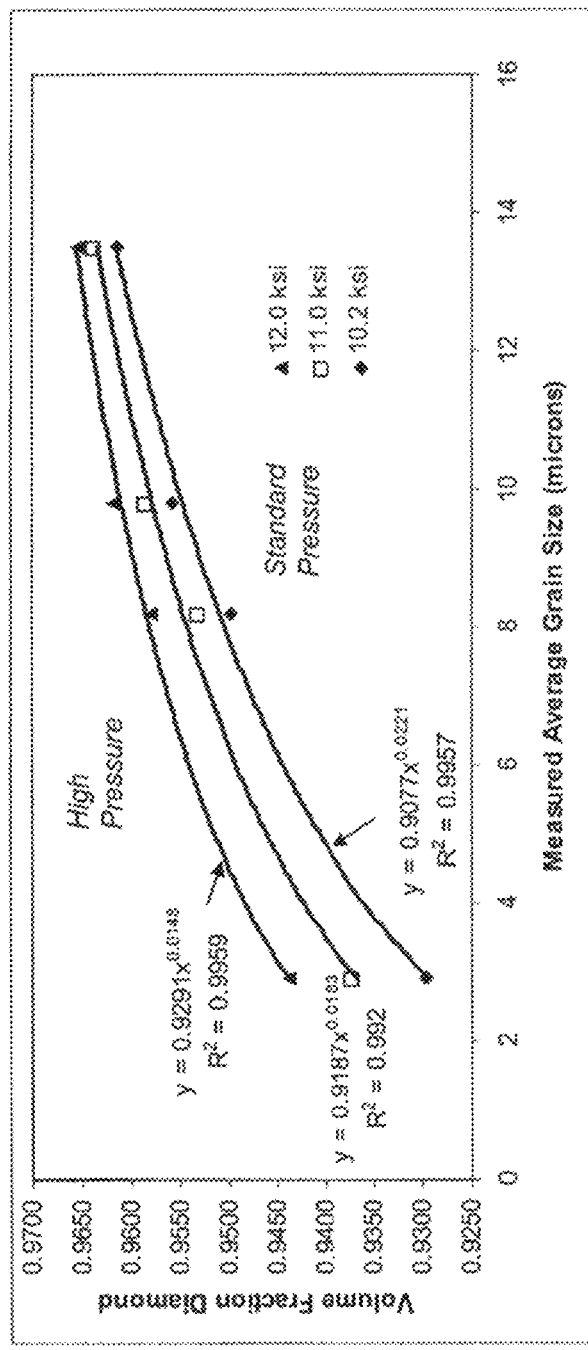
FIG. 10C is a diagram of diamond volume fraction (as measured by a Density technique) versus average grain size for PCD samples sintered at three different pressures (10.2 ksi, 11.0 ksi, and 12.0 ksi).

This data is also plotted in FIG. 10C, which shows the diamond volume fraction versus the measured average grain size. As shown in FIG. 10C, the relationship between diamond volume fraction and average grain size followed the same trend for the three different sintering pressures. Curve fits were applied to the data, and the resulting equations are shown on the chart for each sintering pressure. FIG. 10C shows that the diamond volume fraction depends on the average grain size of the PCD sample. The DVF increases with average grain size (as shown by the upward slope). For a given sintering pressure, increasing the average grain size leads to an increase in diamond volume fraction. This result is likely due to fracturing of the coarser diamond grains, as discussed above.

Additionally, for a given grain size, increasing the sintering pressure led to an increase in the diamond volume fraction. This is due to the higher pressure causing additional compaction of the diamond grains, resulting in smaller voids between the sintered diamond crystals, and a higher density of diamond.

The curve fit for the 10.2 ksi data in FIG. 10C identifies the boundary between high and standard sintering pressures. Thus, a PCD sample can be identified as having been sintered at high sintering pressure by measuring the average grain size and the diamond volume fraction of the sample. For a given grain size, if the diamond volume fraction is above the 10.2 ksi line, then the sample was sintered at higher than standard sintering pressures. If the diamond volume fraction is below the 10.2 ksi line, then the sample was sintered at standard pressures.

Accordingly, PCD with high diamond content, formed by sintering at higher than normal pressures, can be identified as follows (with average grain size in microns):

PCD with a diamond volume fraction greater than (0.9077)·(the average grain size ˆ 0.0221), or PCD with a diamond volume fraction greater than (0.9187)·(the average grain size ˆ 0.0183), or PCD with a diamond volume fraction greater than (0.9291)·(the average grain size ˆ 0.0148), or PCD with a diamond volume fraction greater than one of the following values and an average grain size within the corresponding range:

| Sintered Average Grain Size (micron) | Diamond Volume Fraction (12 ksi) | Diamond Volume Fraction (11 ksi) | Diamond Volume Fraction (10.2 ksi) |
|---|---|---|---|
| 2-4 | 0.939 | 0.930 | 0.922 |
| 4-6 | 0.948 | 0.942 | 0.936 |

-continued

| Sintered Average Grain Size (micron) | Diamond Volume Fraction (12 ksi) | Diamond Volume Fraction (11 ksi) | Diamond Volume Fraction (10.2 ksi) |
|---|---|---|---|
| 6-8 | 0.954 | 0.949 | 0.944 |
| 8-10 | 0.958 | 0.954 | 0.950 |
| 10-12 | 0.961 | 0.958 | 0.955 |

Based on the relationships shown in FIG. 10C, in one embodiment, a PCD sample with high diamond content includes a sintered average grain size within the range of 2-4 microns, and a diamond volume fraction greater than 93%; or a sintered average grain size within the range of 4-6 microns, and a diamond volume fraction greater than 94%; or a sintered average grain size within the range of 6-8 microns, and a diamond volume fraction greater than 95%; or a sintered average grain size within the range of 8-10 microns, and a diamond volume fraction greater than 95.5%; or a sintered average grain size within the range of 10-12 microns, and a diamond volume fraction greater than 96%.

For a given diamond grain size, a higher HPHT pressure creates a cutting element with a lower density. Lower density at higher pressure results because the diamond grains have a lower density than the catalyst material that infiltrates into the diamond layer during sintering. Higher pressure leads to a higher percentage of diamond than catalyst material, as the higher pressure forces the diamond crystals closer together. This reduces the open space between the diamond crystals where the catalyst material can infiltrate the diamond layer. As a result, density of the PCD body is decreased.

As shown in FIG. 10C, the coarser diamond powder mixtures with larger nominal grain size resulted in PCD bodies with a lower metal content. This is likely due to the fracturing of the larger diamond crystals during the HPHT sintering. Finer diamond crystals are more resistant to fracturing than the larger diamond crystals, which fracture and rearrange themselves under pressure, compacting and packing more effectively into the spaces between the crystals and leaving less space for metal from the substrate. Thus, shifting the average grain size of the diamond powder mixture into a more coarse grain size may lead to a PCD layer with a lower metal content.

The PCD sample tests summarized above in Tables II, III, and IV were created from diamond powder mixtures with 2% w cobalt, as noted above, but high diamond content PCD can be formed with more or less cobalt, and/or with varying amounts of other suitable catalyst materials. For example the following data shows two examples of PCD with different amounts of cobalt added to the diamond powder mixture, both pressed at the same pressure. A high diamond content PCD was difficult to achieve in the sample with 20% w cobalt added to the diamond powder mixture, see Table V below.

Accordingly, as summarized above, PCD with high diamond content can be created by sintering at higher than normal pressures, and PCD samples with high diamond content can be identified as such by assessing the high diamond content (by one or more of three methods) and measuring the average grain size.

In one embodiment, a polycrystalline diamond (PCD) body contains a first region extending at least 300 microns within the diamond body proximate the cutting edge. The first region has a high diamond content and a plurality of substantially empty interstitial regions. The combination of high diamond content (with the corresponding microstructure achieved from the ultra high pressure conditions used to form the PCD body) and the substantially empty interstitial regions in a first region extending deep into the PCD body unexpectedly provides a cutting element with superior performance. The superior performance is especially unexpected since the prior art, as discussed above, teaches decreasing the treatment depth with increasing diamond content in the PCD body.

The first region within the PCD body comprises a plurality of interstitial regions that are substantially free of the catalyst material. In one or more embodiments, the first region may comprise at least the critical zone, defined hereinafter. At least a portion of the first region extends to a depth within the PCD body of at least 300 microns (0.3 mm) from the desired surface or surfaces, for example to a depth of at least 350 microns (0.35 mm), at least 400 microns (0.4 mm), at least 500 microns (0.5 mm), at least 600 microns (0.6 mm), or at least 800 microns (0.8 mm) in other embodiments. In one or more embodiments, the interstitial regions may be substantially free of the catalyst material in at least a portion of the first region to a depth within the PCD body of at most 2000 microns (2 mm), suitably at most 1500 microns (1.5 mm), more suitably at most 1000 microns (1 mm). In one or more embodiments, the depth within the PCD body of at least a portion of the first region may be in the range of from 300 microns (0.3 mm) to 1500 microns (1.5 mm). Examples of suitable leach depths include 325 microns, 375 microns, 425 microns, 450 microns, 475 microns, 500 microns, 550 microns, 600 microns, 650 microns, 700 microns, 750 microns, 800 microns, 900 microns, or 1000 microns. The depth of the first region in the PCD body is measured inwardly perpendicular from the surface of interest of the cutting element to the boundary between the first region and an adjacent region. One skilled in the art would appreciate that the depth of the first region may be dependent on the diamond table thickness.

In one or more embodiments, the first region may also include areas of the PCD body in addition to the critical zone, defined hereinafter, but these additional areas may not extend to a depth of at least 300 microns, for example areas of the first region outside the critical zone may only extend to a depth of at most 250 microns, at most 200 microns, or at most 175 microns.

TABLE V

| Added Cobalt (% w) | Hot Cell Pressure (GPa) | Nominal Grain Size (microns) | PCD Density (g/cm$^3$) | Diamond (% v) | Metal (% v) | Diamond (% w) | Cobalt (% w) | Tungsten (% w) |
|---|---|---|---|---|---|---|---|---|
| 2 | 7.1 | 5.5 | 3.992 | 92.5 | 7.5 | 81.4 | 13.8 | 4.8 |
| 20 | 7.1 | 6.0 | 4.167 | 89.4 | 10.6 | 75.3 | 19.8 | 4.9 |

The second region within the PCD body containing catalyst material may have a thickness that is sufficient to maintain a desired bond strength between the PCD body and the material to which it may be attached (e.g., the substrate). In one or more embodiments, the second region within the PCD body may extend a distance of at least about 10 microns (0.01 mm), as measured perpendicular from the interface or lower surface of the PCD body, for example at least 100 microns (0.1 mm), at least 150 microns (0.15 mm), or at least 200 microns (0.2 mm).

Figure 4A:
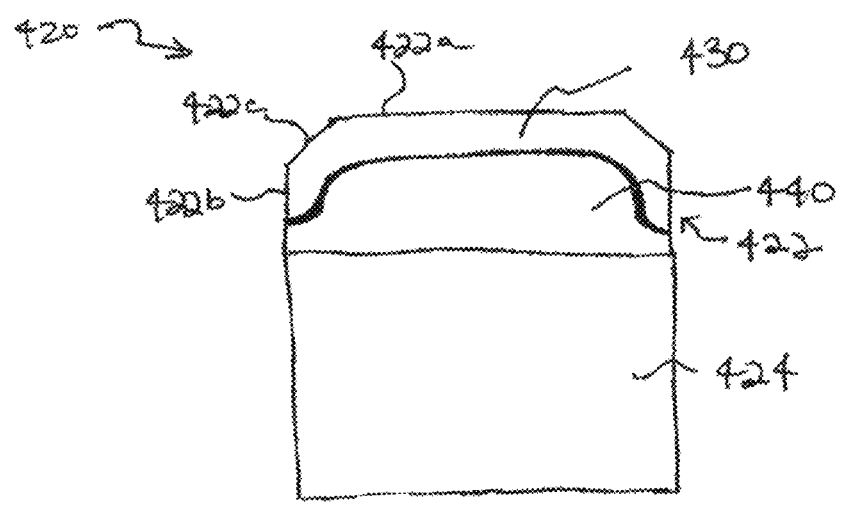
FIG. 4A is a vertical cross-sectional view of a cutting element with a PCD body including first and second regions, according to an embodiment of the present disclosure.

In one or more embodiments, the first region 430 may extend along the entire upper surface 422a of the cutting element 420 as well as the beveled cutting edge 422c and a portion of the side surface 422b, as illustrated in FIG. 4A (viewed in vertical cross-section). In one embodiment, the first region 430 comprises interstitial regions substantially free of the catalyst material. A second region 440 within the PCD body 422 between the first region 430 and the lower surface comprises interstitial regions containing the catalyst material. PCD body 422 is bonded to a substrate 424. The depth (or thickness) of a substantial portion (e.g., at least 75%) of the first region 430 is depicted in FIG. 4A as being substantially uniform in thickness. The term "substantially uniform" as used herein is meant to include variations in thickness of at most 50%, suitably at most 30%, more suitably at most 10%. The thickness of the first region 430 along the upper surface 422a may be substantially the same as the thickness along the side surface 422b and the beveled cutting edge 422c. Alternatively, the thickness of first region 430 may be greater or smaller along the side surface 422b and beveled surface 422c than the thickness along a major portion of the upper surface 422a.

Figure 4B:
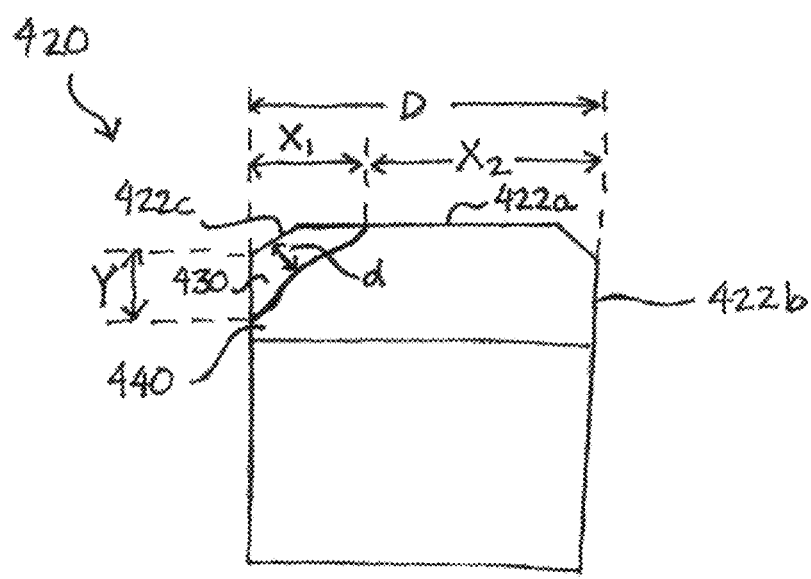
FIG. 4B is a vertical cross-sectional view of a cutting element with a PCD body including first and second regions, according to an embodiment of the present disclosure.

In one or more embodiments, the first region 430 may extend along a portion "X1" of upper surface 422a of the cutting element 420 as well as the beveled cutting edge 422c and a portion "Y" of the side surface 422b, as illustrated in FIG. 4B (viewed in vertical cross-section). The second region 440 extends along a portion "X2" of the upper surface 422a. In one or more embodiments, the first region 430 may extend along the upper surface 422a from the side surface 422b (along portion X1) at least 1000 microns, as measured from the side surface 422b, for example at least 1250 microns, at least 1500 microns, at least 2000 microns, at least 2500, or at least 3000 microns in other embodiments. In one or more embodiments, the first region 430 may extend along the upper surface 422a from the side surface 422b (along portion X1) less than 50% of the diameter "D" of the cutting element 420, as measured from the side surface 422b, for example at most 30%, at most 25%, such as 20%, 15%, or 12.5% of the diameter of the cutting element. In one or more embodiments, the first region 430 may extend along the side surface 422b (portion Y) at least 300 microns, measured from the lower end of cutting edge 422c, for example at least 500 microns, at least 1000 microns, at least 1500 microns, at least 2500 microns, at least 3500 microns in other embodiments.

The first region of the PCD body having a depth "d" of at least 300 microns may extend along at least a "critical zone" when viewed in vertical cross-section. The critical zone extends along the length of the cutting edge and along the upper surface of the PCD body for at least 1000 microns, for example at least 12.5% of the diameter of the cutting element, measured from the side surface, and at least 300 microns along the side surface, measured along the side surface from the lower end of the cutting edge. The critical zone also extends along at least a portion of the circumferential distance of the PCD body. Suitably, the critical zone may extend along a major portion of the circumferential distance of the PCD body, such as along 25% of the circumference. Suitably, the critical zone may extend along the entire circumferential distance of the PCD body allowing the cutting element to be reused on a drill bit without having to undergo an additional treatment step.

In one or more embodiments, the diamond crystals (grains or particles) used to form the PCD body may have grain sizes in the range of from about 10 nanometers to about 50 micrometers (microns) prior to sintering, for example from 1 micron to 40 microns or from 1 micron to 30 microns, in other embodiments. In one or more embodiments, the diamond crystals may have an average grain size of at most 25 microns, at most 20 microns, at most 15 microns or at most 12 microns in other embodiments. Suitably, the diamond crystals may have an average grain size in the range of from 1 to 25 micrometers, for example in the range of from 2 to 20 microns or from 4 to 10 in other embodiments. The diamond crystals may have a mono-modal or multi-modal grain size distribution. If a catalyst material is mixed with the diamond crystals, the catalyst material may be provided in the form of a separate powder or as a coating on the diamond particles. The catalyst material facilitates intercrystalline bonding of the diamond crystals during the HPHT sintering process.

In another embodiment, a PCD body is provided with a bilayer construction including a first layer proximate the cutting edge and a second layer proximate the interface with the substrate. The second layer of PCD material proximate the interface (the PCD "bilayer" or the "interlayer") has more catalyst material and a lower DVF than the remainder of the PCD layer. This bilayer construction can be accomplished in different ways. In one or more embodiments, the PCD body may be formed using two or more diamond mixtures to form different layers of the PCD body. In an example embodiment, the first layer forming at least the cutting edge may be formed using at least a first diamond mixture comprising diamond crystals having a lower (finer) average grain size than the diamond crystals in at least a second diamond mixture used to form the second layer. Alternatively, the first layer may be formed using a first diamond mixture comprising diamond crystals having a greater (coarser) average grain size than the diamond crystals in a second diamond mixture used to form the second layer. Other options include powder mixtures having the same average grain size but differing particle size distributions, and/or powder mixtures incorporating differing amounts of premixed solvent catalyst or other particulate additions such as tungsten or tungsten carbide. In additional embodiments, three or more layers using different diamond mixtures may be used.

In an example embodiment, the smaller, fine diamond grains in the diamond mixture are removed from the mixture near the interface with the substrate. The smaller diamond grains are more difficult to fracture, leading to larger porosity of the diamond body during sintering near the substrate, which allows more catalyst material from the substrate to infiltrate this layer during HPHT sintering. As a result, the diamond body nearest the substrate has a lower diamond content and a higher coefficient of thermal expansion than the remainder (such as the first layer) of the diamond body away from the substrate. This reduces the thermal stresses in this second layer and alleviates crack growth along the interface. In general, increasing the average particle size of a diamond mixture can lead to less metal content, due to the fracturing of the large diamond crystals and less pressure necessary to achieve a given diamond content. For example, shifting the diamond crystals from particles of 5-15 microns to particles of 10-20 microns may lead to lower metal content in the diamond body for a given pressure. However, the technique described in this example embodiment for a multiple layer diamond body may not be shifting the average particle size of the diamond mixture as a whole, but rather removing the smaller grains from the second layer nearest the substrate interface. This can allow for more catalyst material from the substrate to infiltrate this layer, leading to a higher metal content.

In an example embodiment, a larger amount of catalyst material may be added to the diamond mixture in the second layer near the substrate interface (which may include at least a portion of the second region) than in the one or more diamond mixtures used to form the rest of the diamond body (e.g., the first layer which may include at least a portion of the first region). In an example embodiment, the first layer may be formed using a first diamond mixture comprising a catalyst material in a quantity that is lower (lesser amount) than a second diamond mixture used to form the second layer which may form at least a major (greater than 50% v) portion of the second region. After sintering, the diamond body has a second layer with a lower diamond content (e.g. lower diamond volume fraction) near the substrate and a first layer with a higher diamond content away (remote) from the substrate.

In an example embodiment, the first layer of the diamond body may be formed from one or more diamond mixtures having a different particle size distribution than the one or more diamond mixtures used to form the second layer of the diamond body. The second layer may have a higher proportion of coarse-sized diamond particles and fewer fine-sized diamond particles, so that there is more space between the coarse-sized diamond particles for the catalyst material from the substrate to infiltrate. This may be accomplished by removing a portion of the fine-sized particles from the diamond mixture used to form the second layer. This can lead to an increase in metal content in the second layer, near the substrate.

In one or more embodiments, the first region proximate the cutting edge and at least a portion of the upper surface of a PCD body may contain the catalyst material in a quantity of less than 8% by volume, after sintering and prior to removal of the catalyst material from the interstitial regions of the PCD body. Suitably, prior to removal of the catalyst material from the interstitial regions of the PCD body, the first region may contain the catalyst material in a quantity of less than 6% v, for example in other embodiments, at most 5.75% v, at most 5.5% v, at most 5% v, at most 4.75% v, at most 4.5% v, or at most 4.25% v, same basis.

In one or more embodiments, prior to removal of the catalyst material from the interstitial regions of the PCD body, the first region may have a density of at most 3.88 g/cm3, for example at most 3.87 g/cm3 where the first region of the PCD body was prepared using diamond crystals having a sintered average grain size of at most 20 microns.

In one or more embodiments, prior to removal of the catalyst material from the interstitial regions of the PCD body, the first region may have a density of at most 3.90 g/cm3 (grams per cubic centimeter), for example at most 3.89 g/cm3 where the first region of the PCD body was prepared using diamond crystals having an average grain size of at most 15 microns.

In one or more embodiments, prior to removal of the catalyst material from the interstitial regions of the PCD body, the first region may have a density of at most 3.94 g/cm3, for example at most 3.93 g/cm3 where the first region of the PCD body was prepared using diamond crystals having an average grain size of at most 12 microns.

In one or more embodiments, the cutting element has a first region having diamond volume fraction of greater than 90% by volume (% v), for example at least 91% v, at least 92% v, at least 92.5% v, at least 93% v, or at least 94% v in other embodiments. In one or more embodiments, the cutting element has a first region having a diamond volume fraction in the range of from greater than 90% v to 99% v, such as 93.5% v, 94.5% v, 95% v, 96% v, 97% v, or 98% v. In one embodiment, a first region of a PCD body includes a sintered average grain size less than 25 microns and a diamond volume fraction greater than 92%; and in another embodiment a sintered average grain size of at most 15 microns and a diamond volume fraction greater than 92.5%; and in another embodiment a sintered average grain size in the range of from 2.5 to 12 microns and a diamond volume fraction greater than 92.5%.

In one or more embodiments, the second region may have a diamond content (e.g. diamond volume fraction) that is substantially the same as the first region. As used herein, "substantially the same diamond volume fraction" is meant to include variations of at most 2% suitably at most 1%.

In one or more embodiments, a major portion (i.e., greater than 50% by volume) of the second region of the PCD body may have a lower diamond content (e.g. lower diamond volume fraction) than the first region. In one or more embodiments, a major portion of the second region of the PCD body may have a diamond volume fraction more than 2% lower than the diamond volume fraction of the first region (e.g., proximate the exterior surface of the PCD body), for example at least 3% v or at least 4% v lower than the first region. In this embodiment, the diamond volume fraction of the second region may be at least 85%, for example in the range of from 85% to 95%, for example 87.5%, 90%, or 92%. The diamond content may change in a gradient or step-wise manner within the PCD body.

In one or more embodiments, the second region may have a tungsten content (including tungsten carbide) of at most 15% by weight (% w), for example at most 10% w or at most 5% w. The amount of tungsten may be determined by spectroscopic methods or by chemical analysis. The tungsten is essentially converted to tungsten carbide during the HPHT sintering operation.

Various cutting elements with a bilayer construction and varying interface geometries were tested to determine the yield and to compare the coefficients of thermal expansion of the substrate, the first PCD layer (proximate the cutting edge), and the second PCD layer (proximate the substrate). Approximately 200 cutting elements without a bilayer construction and over 1,000 with a bilayer were tested. The overall thickness of the combined PCD layer (first and second layers) was 0.100 inches (2.54 mm). The thickness of the second layer was 0.060 inches (1.52 mm). It should be understood that the relative thickness of the first layer (the layer having the cutting surface) and the second layer (also referred to as the bilayer) (between the first layer and the substrate) may vary. In some embodiments, the second layer has a greater thickness than the first layer, and in other embodiments the first layer has a greater thickness than the second layer, or they may be equal.

Characteristics of each component were as follows. The carbide substrate contained 87.0% by weight tungsten carbide and 13.0% cobalt. The coefficient of thermal expansion (CTE) of the substrate at three temperature ranges was measured to be as follows (with "RT" indicating room temperature, and temperatures given in ° C.) (note, the carbide substrate was tested to a higher temperature than the PCD layers due to the expansion caused by graphitization of diamond above 800° C.):

| Carbide Substrate | |
|---|---|
| Temperature Range | CTE |
| RT-200 | 5.86E−06 |
| 200-500 | 6.64E−06 |
| 500-965 | 7.32E−06 |

The diamond powder was sintered with this substrate at higher than normal HPHT conditions to produce a PCD layer with high diamond content. The second layer contained 94.3% by volume diamond and 5.7% by volume cobalt and tungsten carbide (as determined by the Density method described above). Percentages by weight were 84.7% diamond, 11.2% cobalt, and 4.1% tungsten carbide after sintering. The average diamond grain size was 12.4 microns. The coefficient of thermal expansion was calculated as follows (based on a linear extrapolation of data from PCD samples with lower DVF):

| PCD Second Layer | |
|---|---|
| Temperature Range | CTE |
| RT-200 | 2.479E−06 |
| 200-500 | 3.272E−06 |
| 500-800 | 4.164E−06 |

The first layer of the PCD contained 94.0% by volume diamond, and 6.0% cobalt and tungsten carbide. Percentages by weight were 85.7% diamond, 10.9% cobalt, and 3.9% tungsten carbide. The average diamond grain size was 13.0 microns. The coefficient of thermal expansion was calculated as follows (based on a linear extrapolation of data from PCD samples with lower DVF):

| PCD First Layer | |
|---|---|
| Temperature Range | CTE |
| RT-200 | 2.471E−06 |
| 200-500 | 3.262E−06 |
| 500-800 | 4.151E−06 |

As this data shows, the second layer (bilayer) had a slightly increased coefficient of thermal expansion compared to the first layer, thereby partially bridging the gap between the coefficients of the substrate and the first layer. Although the increase was not large, the PCD cutting elements with this bilayer construction had a noticeably higher yield than PCD without a bilayer. The inventors have found that typical yields without a bilayer are 85-90%. The testing above showed that the yield with the bilayer present was above 99%.

Another example of the effect of a bilayer construction is provided below. PCD cutting elements with the same material and interface were formed, and the presence of cracks was noted for cutting elements with and without a bilayer.

TABLE VI

| | Protrusion Ratio | Hot Pressure | Interface Geometry | Yield |
|---|---|---|---|---|
| Cutting elements with bilayer | 0.57 | 6.2 GPa | A5 | 95% (152/160) |
| Cutting elements without bilayer | 0.57 | 6.2 GPa | A5 | 63% (25/40) |

Interface A5 had the same dome radius as interfaces A1-A4 described below, and a protrusion ratio of 0.57.

Figure 7:
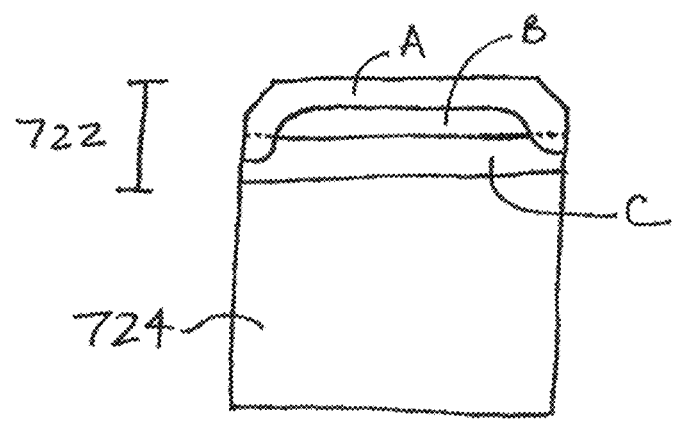
FIG. 7 is a vertical cross-sectional view of a cutting element with a PCD body including first, second, and third regions, according to an embodiment of the present disclosure.

In an example embodiment, the PCD body may comprise a bilayer construction having first and second layers and a first region within the diamond body. As illustrated in FIG. 7 (a vertical cross-sectional view), a cutting element 720 contains a diamond body 722 bonded to a substrate 724. The diamond body 722 contains two layers B and C and a first region A extending into portions of layers B and C. Thus, three distinct regions may be found within the diamond body: region A forms the first region and layer C forms the second region, while the portion of layer B positioned in between (interposed) the first and second regions forms a third region within the diamond body. The second region may contain a metal carbide (e.g., tungsten carbide) and have a different average diamond particle size and/or particle size distribution from the first and third regions. The first region may have the same average diamond particle size and particle size distribution as the third region or, alternatively, a major portion of the first region may have a different average diamond particle size and/or particle size distribution as the third region (i.e., more than two layers are used to form the diamond body). In another example embodiment, catalyst material may be added to the diamond mixture used to form the first layer (B), while the diamond mixture used to form the second layer may be substantially free of added catalyst material. The addition of catalyst in the first layer may be useful, as sufficient catalyst material from the substrate may not infiltrate to the first layer. In another embodiment, catalyst material may be added to the diamond mixture used to form the second layer (C), while the diamond mixture used to form the first layer (B) may be substantially free of added catalyst material or may have added catalyst in a smaller amount than the second layer. After sintering, the second layer has a higher metal content than the other regions.

In one embodiment, a PDC body such as body 722 includes a bilayer construction (layers B and C) as well as a treated region (A) extending into portions of the first and/or second layers. The treated region A may be leached to remove substantially all of a catalyst material from the interstitial regions between the diamond crystals. The region A may extend from a cutting surface to a depth of no more than 100 microns, or in another embodiment a depth in the range of 100 microns to less than 300 microns, or in another embodiment a depth of at least 300 microns. The treated region may extend partially into the first layer (B), all the way through the first layer (B), and/or into the second layer (C).

In an example embodiment, the one or more diamond mixtures used to form the first and third layers may be subjected to conditions sufficient to graphitize at least a portion of the diamond crystals, while the diamond mixture used to form the second layer may not be subjected to conditions sufficient to graphitize at least a portion of the diamond crystals.

One skilled in the art after learning the teachings of the present disclosure would appreciate that multiple diamond mixtures may be used to form the PCD body and may form a gradient (gradual transition) or a step-wise (abrupt) transition within the PCD body. In one or more embodiments, the cutting element may also comprise a PCD body having properties of diamond density, catalyst material concentration, and/or diamond grain size that change as a function of position within the diamond table. Such variations may occur along a gradient or step-wise and may provide one or more different properties to the cutting element.

The bilayer embodiments described above provide a PCD layer that has a high diamond content at the cutting surface, such that the cutting surface has the desired wear resistance and stiffness, while also providing a lower diamond content near the substrate, such that the thermal stresses at the interface surface are reduced. A multi-layer construction may be provided, with several separate layers within the PCD layer. The layers increase in diamond content moving away from the substrate. The transition between these layers may be gradual, forming a gradient, or it may be more abrupt. Instead of a multi-layer construction, a single layer may be provided having a density gradient, such that for example the diamond density of the layer gradually increases in a direction away from the interface, toward the cutting face.

Additionally, the bilayer construction may be treated to remove the catalyst material from a first region of the PCD body, such that the first region has a high diamond content and a plurality of substantially empty interstitial regions. A second region may include catalyst material in the interstitial regions. The first region may extend partially through the first layer of the bilayer construction, all the way through the first layer, or all the way through the first layer and partially through the second layer.

As used herein, the term "catalyst material" is understood to refer to materials that were used to initially form the diamond layer (i.e., bond the diamond particles together), and can include materials identified in Group Viii of the Periodic table (e.g., cobalt). The catalyst material may be selected from Group VIII elements of the Periodic table (CAS version in the CRC Handbook of Chemistry and Physics), in particular selected from cobalt, nickel, iron, mixtures thereof, and alloys thereof, preferably cobalt.

As used herein, the term "removed" is used to refer to the reduced presence of a specific material in the interstitial regions of the diamond layer, for example the reduced presence of the catalyst material used to initially form the diamond body during the sintering or HPHT process, or metal carbide present in the PCD body (a metal carbide, such as tungsten carbide, may be present through addition to the diamond mixture used to form the PCD body (for example from ball milling the diamond powder) or through infiltration from the substrate used to form the PCD body). It is understood to mean that a substantial portion of the specific material (e.g., catalyst material) no longer resides within the interstitial regions of the PCD body, for example the material is removed such that the voids or pores within the PCD body may be substantially empty. However, it is to be understood that some small amounts of the material may still remain in the microstructure of the PCD body within the interstitial regions and/or remain adhered to the surface of the diamond crystals.

By "substantially free of added catalyst material", it is understood to mean that no catalyst material, other than catalyst material left as an impurity from manufacturing the diamond crystals, is added to the diamond mixture. That is, the term "substantially free", as used herein, is understood to mean that a specific material is removed, but that there may still be some small amounts of the specific material remaining within interstitial regions of the PCD body. In an example embodiment, the PCD body may be treated such that more than 98% by weight (% w of the treated region) has had the catalyst material removed from the interstitial regions within the treated region, in particular at least 99% w, more in particular at least 99.5% w may have had the catalyst material removed from the interstitial regions within the treated region. 1-2% w metal may remain, most of which is trapped in regions of diamond regrowth (diamond-to-diamond bonding) and is not necessarily removable by chemical leaching.

The term "substantially empty", as used herein, is understood to mean that at least 75% of the volume of a void or pore is free from a material such as a catalyst material or metal carbide, suitably at least 85% v, more suitably at least 90% v is free from such materials. The quantity of the specific material remaining in interstitial regions after the PCD body has been subjected to treatment to remove the same can and will vary on such factors as the efficiency of the removal process, and the size and density of the diamond matrix material. The specific material to be removed from the PCD body may be removed by any suitable process. Treatment methods include chemical treatment such as by acid leaching or aqua regia bath and/or electrochemical treatment such as by an electrolytic process. Such treatment methods are described in US2008/0230280 A1 and U.S. Pat. No. 4,224,380, which methods are incorporated herein by reference. Treatment by leaching is also discussed in more detail below.

High diamond content PCD bodies created using ultra high pressures have a unique microstructure which in combination with a treatment depth of at least 300 microns can provide an improvement in one or more properties of the cutting element.

In one embodiment, a first region of the PCD body of the cutting element is treated to remove the catalyst material from a plurality of interstitial regions contained therein. Such treatment methods include those described herein, preferably acid leaching. As discussed above, in one or more embodiments, the first region may comprise the cutting edge, the entire upper surface of the PCD body and at least a portion of the side surface. In one or more other embodiments, the first region may comprise the cutting edge and only a portion of the upper surface and side surface of the PCD body (e.g., critical zone), and the second region or another region containing catalyst material within a plurality of interstitial regions may extend to a remaining portion of the upper surface and side surface of the PCD body. The treatment of the first region may be accomplished by protecting the outer portions of the PCD body adjacent the targeted treatment region from contact (liquid or vapor) with the leaching agent. The substrate may also be protected from such contact. Methods of protecting the substrate and/or PCD body surfaces include covering, coating or encapsulating the substrate and/or portions of the PCD body with a suitable barrier member or material such as wax, plastic, or the like.

In one or more embodiments, the first region of the PCD body is rendered thermally stable by removing substantially all of the catalyst material therefrom by exposing the desired surfaces to an acid leaching agent, as described herein. Suitably, after the PCD body is made by the high pressure HPHT sintering process, the identified surface or surfaces are placed into contact with the acid leaching agent for a sufficient period of time to produce the desired leaching or catalyst material depletion depth in the first region.

Suitably, leaching agents for treating the first region to be rendered thermally stable include materials selected from inorganic acids, organic acids, mixtures and derivatives thereof. The particular leaching agent used may depend on such factors as the type of catalyst material used, and the type of other non-diamond metallic materials that may be present in the PCD body. In an example embodiment, suitable leaching agents may include hydrofluoric acid (HF), hydrochloric acid (HCl), nitric acid (HNO3) and mixtures thereof. Other methods for leaching the catalyst material from the PCD body are described herein.

In one or more embodiments, the PCD body has a microstructure such that it requires at least 3 days under standard conditions, described below, to leach substantially all the catalyst material from the interstitial regions in the PCD body in the first region, to a depth of 300 microns. Suitably, the PCD body may have a microstructure such that it requires at least 3.5 days under standard conditions, described below, to leach substantially all the catalyst material from the interstitial regions in the PCD body to a depth of 300 microns, or for example at least 4 days, at least 4.5 days, at least 5 days, at least 6 days, at least 7 days, at least 8 days, at least 9 days, at least 10 days, or at least 14 days in other embodiments. In one embodiment, the standard conditions include contacting a region of the PCD body with a sufficient volume of an acid mixture at a temperature of 40° C.±2° C. under atmospheric pressure. The acid mixture is 50% v of a first acid solution and 50% v of a second acid solution. The first acid solution is 48% w hydrofluoric acid and 52% w water. The second acid solution is 68% w nitric acid and 32% w water. In this embodiment, the first region of the PCD body prior to leaching treatment may have at most 6% w metal carbide (e.g., tungsten carbide), for example at most 5.5% w, at most 5% w, or at most 4.5% w in other embodiments. In this embodiment, the first region of the PCD body may have in the range of from 0 to 6% w metal carbide (e.g., tungsten carbide). Subjecting the first region of the PCD body to the standard conditions for a sufficient duration (such as at least 3 days) results in the removal of substantially all of the catalyst material from the interstitial regions in this first region of the PCD body.

In one or more embodiments, accelerating techniques for removing the catalyst material may also be used, and may be used in conjunction with the leaching techniques noted herein as well as with other conventional leaching processes. Such accelerating techniques include elevated pressures, elevated temperatures and/or ultrasonic energy, and may be useful to decrease the amount of treatment time associated with achieving the same level of catalyst removal, thereby improving manufacturing efficiency.

In one embodiment, the leaching process may be accelerated by conducting the same leaching process described above under conditions of elevated pressure that may be greater than about 5 bar, and that may range from about 10 to 50 bar in other embodiments. Such elevated pressure conditions may be achieved by conducting the leaching process in a pressure vessel or the like. It is to be understood that the exact pressure condition can and will vary on such factors as the leaching agent that is used as well as the materials and sintering characteristics of the diamond body.

In addition to elevated pressure, elevated temperatures may also be used for the purpose of accelerating the leaching process. Suitable temperature levels may be in the range of from about 90° C. to 350° C. in one example embodiment, and in the range of from about 175° C. to 225° C. in another example embodiment. In one or more embodiments, elevated temperature levels may range up to 300° C. It is to be understood that the exact temperature condition can and will vary on such factors as the leaching agent that is used as well as the materials and sintering characteristics of the diamond body. It is to be understood that the accelerating technique may include elevated pressure in conjunction with elevated temperature, which would involve the use of a pressure assembly capable of producing a desired elevated temperature, e.g., by microwave heating or the like. For example, a microwave-transparent pressure vessel may be used to implement the accelerated leaching process. Alternatively, the accelerating technique may include elevated temperature or elevated pressure, i.e., one or the other and not a combination of the two.

Ultrasonic energy may be used as an accelerating technique that involves providing vibratory energy operating at frequencies beyond audible sound, e.g., at frequencies of about 18,000 cycles per second and greater. A converter or piezoelectronic transducer may be used to form a desired ultrasonic stack for this purpose, wherein the piezoelectric crystals are used to convert electrical charges to desired acoustic energy, i.e., ultrasonic energy. Boosters may be used to modify the amplitude of the mechanical vibration, and a sonotrode or horn may be used to apply the vibration energy. The use of ultrasonic energy may produce an 80 to 90 percent increase in leaching depth as a function of time as compared to leaching without using ultrasonic energy, thereby providing a desired decrease in leaching time and an improvement in manufacturing efficiency.

In one or more embodiments, the cutting element may also have one or more intermediate layers as well as planar and non-planar interfaces and surfaces. Reference may be made to U.S. Pat. Nos. 6,041,875; 6,513,608; 6,962,218; 7,604,074; 7,287,610, as examples of non-planar interfaces and such descriptions are incorporated herein by reference. Conventional cutting elements (shear cutters) incorporate substrates with relatively aggressive protrusions such as rings and ridges at the interface surface, as these protrusions are believed to arrest crack growth in the PCD body by creating alternating areas of tensile and compressive stresses. However, for some PCD bodies with a high diamond content, these stresses should be reduced in order to avoid crack growth, due in part to higher thermal expansion differences between the substrate and the sintered PCD material, and also the lower toughness that comes with high diamond content.

In one embodiment, the interface between the PCD layer and the substrate has less aggressive protrusions than those provided in the prior art. Conventional shear cutters incorporate substrates with relatively aggressive protrusions such as rings and ridges, as these protrusions are believed to arrest crack growth by creating alternating areas of tensile and compressive stresses, as described above. However, aggressive protrusions can also create stress concentrations and increase the magnitude of the residual stresses in the PCD layer. For PCD with high diamond content, these stresses need to be reduced in order to avoid crack growth, due in part to the lower toughness that comes with high diamond content. Accordingly, contrary to traditional thinking, the inventors have discovered that for PCD with high diamond content, a smoother interface reduces stress concentrations and crack growth.

Figure 9:
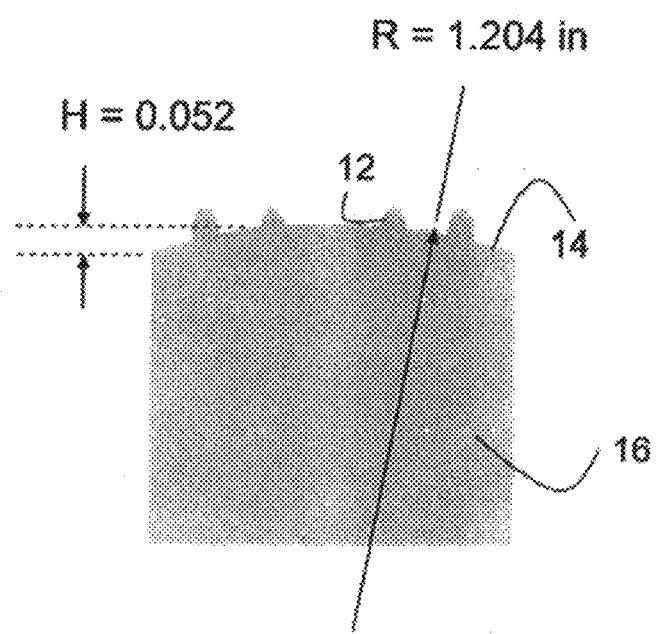
FIG. 9 is a vertical cross-sectional view of a substrate with a domed interface surface, according to an embodiment of the present disclosure.

In an example embodiment, as illustrated in FIG. 9, the interface surface 14 of the substrate 16 may have a slight dome, for example the dome may have a constant radius "R" of 1.204 inches (30.58 mm); a height "H" of 0.052 inches (1.321 mm); and a ratio of the height of the dome to the diameter of the substrate of 0.074. The ratio of the height of the dome to the diameter of the substrate may be at most 0.2, or for example at most 0.15 or at most 0.1 in other embodiments.

Figure 5:
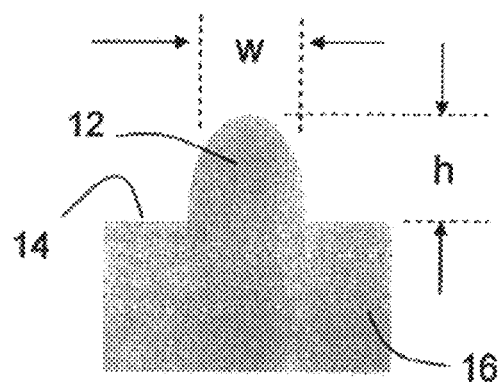
FIG. 5 a partial cross-sectional view of an interface including a protrusion with a rounded top surface.
Figure 6:
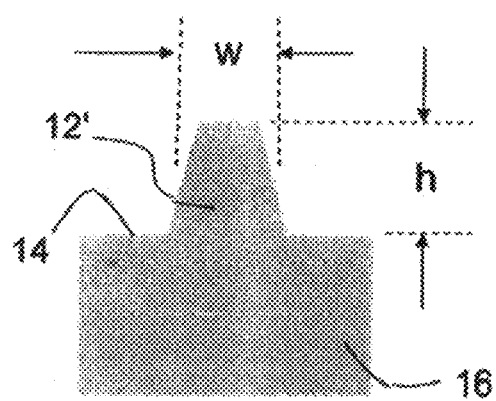
FIG. 6 is a partial cross-sectional view of an interface including a protrusion with a flat top surface.

In one or more embodiments, the interface surface of the substrate includes one or more protrusions, such as the protrusions 12 and 12' shown in FIGS. 5 and 6. In the embodiments of FIGS. 5 and 6, the height "h" of the protrusion 12, 12' was measured from the domed surface 14 of substrate 16. The width "w" of the protrusion 12, 12' was measured at half of the protrusion's maximum height h. The height-to-width ratio (the "protrusion ratio") was taken by dividing the height by the width. This definition of protrusion as used herein not only applies to generally convex shapes extending upward on the substrate surface as shown in FIGS. 5 and 6, but also to generally concave regions or grooves depressed into the substrate. The smooth domed surface 14 was of height H and diameter D (referring to FIG. 9). In one or more embodiments, the protrusion ratio may be less than 0.7, at most 0.5, at most 0.4, or less than 0.2, for example in the range of from 0 to 0.5, such as 0.05, 0.1, 0.125, 0.15, 0.175, 0.25, 0.3, 0.35, or 0.45. As shown in FIGS. 5 and 6, the protrusions 12,12' may be rounded and continuously curved (as shown in FIG. 5) or may included flat ends with discrete corners or edges (as shown in FIG. 6).

In one or more embodiments, the interface surface of the substrate may have one or more non-aggressive protrusions having a maximum height h, measured from the substrate surface, of at most 0.050 inches (1.27 mm), suitably at most 0.045 inches (1.14 mm), at most 0.040 inches (1.02 mm), at most 0.35 inches (0.89 mm), at most 0.030 inches (0.76 mm), at most 0.25 inches (0.64 mm), or at most 0.20 inches (0.51 mm) in other embodiments. In one or more embodiments, the one or more non-aggressive protrusions having a height of at most 0.050 inches (1.27 mm) may be positioned proximate the side surface of the substrate.

In one or more embodiments, the one or more non-aggressive protrusions have continuously contoured surfaces. In one or more embodiments, the interface surface of the substrate has only non-aggressive protrusions thereon, such as protrusions with a protrusion ratio less than 0.7. In one embodiment, a PCD cutting element includes an interface with a protrusion ratio less than 0.7, and a PCD body with a treated first region. The first region may extend into the PCD body from a cutting surface to a depth of no more than 100 microns, or in another embodiment a depth in the range of 100 microns to less than 300 microns, or in another embodiment a depth of at least 300 microns.

Substrates with four different geometries having varying degrees of protrusion were sintered with a diamond powder mixture to form PCD with high diamond content, and the percentage of cutting elements without cracks was documented. The percentage of cutting elements that did not have cracks after the high pressure HPHT sintering process was completed is referred to as the "yield." As shown in FIG. 9, all of the substrates 16 had a slight dome at the interface surface 14. The radius at the interface surface 14 was a constant 1.204 inches, and the height H of the dome was 0.052 inches, as shown in FIG. 9. The ratio of the height H of the dome to the diameter D of the substrate was approximately 0.074. The thickness of the sintered PCD table was 0.090 inches. The starting diamond grain size was approximately 14.4 microns, and the hot cell pressure was 7.1 GPa.

Substrates with the four different geometries were combined with the diamond powder mixture and subjected to HPHT sintering at the high pressure conditions in FIG. 11 (in the high diamond content region). Two different sets of process parameters were used to form these high diamond content cutting elements. A first set of cutting elements were formed according to a first set of HPHT sintering parameters, including a brazing process which was performed to add an extension to the cutting element. Carbide sections may be joined together to extend the substrate to a longer length. Methods for joining carbide sections together are well known in the art, and include torch, furnace, and induction brazing methods. Brazing is also commonly known as bonding or LS bonding. Induction methods are commonly used for joining shear cutters carbide substrates to longer carbide pieces following the sintering process. The induction method is used because it can be employed in conjunction with both inert gases and heat sinks to protect the PCD from oxidation and thermal damage. However, these methods for joining carbide sections together can cause cracks to form in the PCD layer.

After sintering and induction brazing of the aforementioned cutters was complete, the resulting high diamond content PCD cutting elements were examined for cracks to determine the yield for each geometry. The results of this testing are summarized in Table VII below:

TABLE VII

| Interface Geometry | Description | Protrusion Height | Protrusion Width | Protrusion Ratio (h/w) | Yield (number without cracks/ total number tested) -- first set of process parameters |
|---|---|---|---|---|---|
| A1 | Relatively aggressive, sharp protrusions | 0.035 in | 0.046 in | 0.76 | 25% (5/20) |
| A2 | Relatively aggressive, rounded protrusions | 0.045 in | 0.063 in | 0.71 | 26% (5/19) |
| A3 | Less aggressive, rounded protrusions | 0.035 in | 0.064 in | 0.55 | 50% (9/18) |
| A4 | No protrusions | 0 | 0 | 0.00 | 100% (20/20) |

Figure 12:
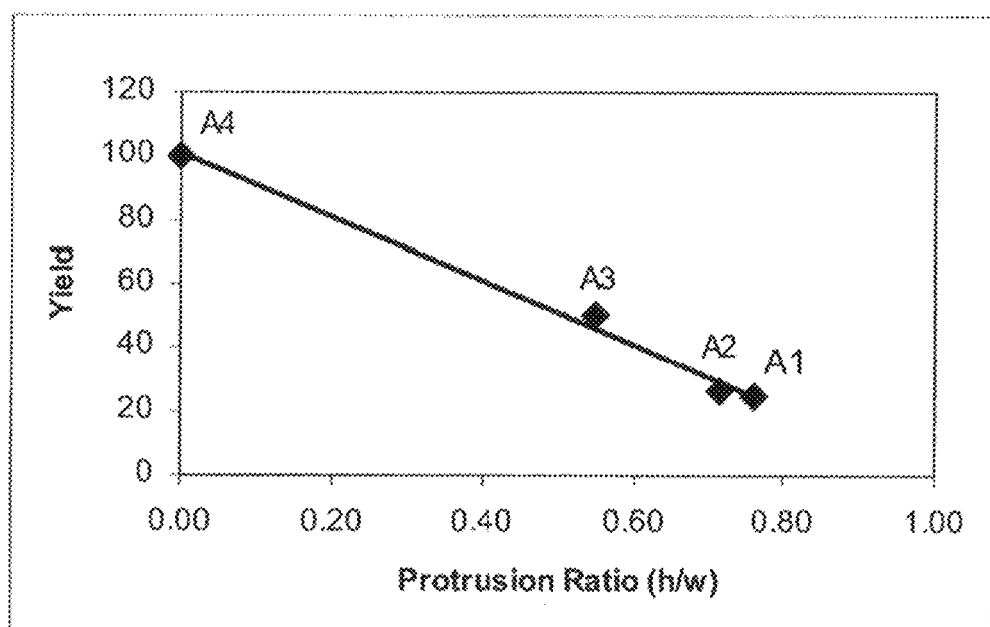
FIG. 12 is a diagram of yield versus protrusion ratio for cutting elements according to embodiments of the present disclosure with varying substrate geometries.

These results are also shown in the diagram of FIG. 12. The results show that the protrusion ratio has an inverse linear relationship with yield. The yield improves with decreasing ratio. The geometry that gave the best yield (A4) was a smooth dome without any protrusions (protrusion ratio was zero). This substrate (A4) had a smooth domed surface, with the radius of the dome being approximately 13 times the thickness of the PCD layer and approximately 23 times the height H of the dome.

Of the substrates that had protrusions (A1, A2, and A3), the substrate with the least aggressive protrusions (A3) had the best yield. The protrusion ratio of substrate A3 was lower than that of A1 and A2, meaning that the protrusions were less aggressive in height versus width. Substrate A1 had sharp protrusions, while A2 had rounded protrusions, but the data indicated that this difference did not seem to have an effect on the yield. The more aggressive protrusions in substrates A1 and A2 extend up to their full height over a smaller width. This more aggressive geometry produced cutting elements with more cracks than the other geometries. The inventors believe that aggressive protrusions (such as those having a protrusion ratio over 0.7) cause stress concentrations in the high diamond content PCD layer and along the interface, which lead to crack growth.

Notably, the diagram of FIG. 12 indicates a linear relationship between protrusion ratio and yield.

A second set of cutting elements with the geometries defined above were formed according to a second set of HPHT sintering parameters, included a refinement of the sintering parameters, the PCD bilayer structure, and the cobalt content. These changes included more consistent process parameters, lower temperature at bonding, and lower cobalt content in the substrate. The second set of cutting elements had a higher yield; the second set of sintering parameters resulted in an increased yield for a given protrusion ratio. The results continue to indicate a linear trend, with yield increasing with a decreasing protrusion ratio. For the second set of cutting elements, the slope of the line was less steep. The first set of cutting elements produce a steeper line, with yield dropping off more rapidly with increasing ratio. Based on the refined sintering parameters used to form the second set of cutters, the line was shallower, with yield dropping more slowly with increasing ratio.

These results indicate that the slope of the line in FIG. 12 depends on variables such as pressure, temperature, and brazing. The slope of the curve fit linking yield and ratio may become steeper with increasing pressure, such as cold cell pressures above 7.0 GPa. The slope may also vary with refinement of the sintering processes.

Accordingly, in some embodiments, the protrusion ratio is less than 0.2, in order to raise the yield to at least approximately 80%, as shown in the diagram of FIG. 5. In a preferred embodiment, the protrusion ratio is zero (i.e., no protrusions). In another embodiment, for cutting elements with high diamond content, a protrusion ratio above 0.5 provides acceptable yields. In one embodiment, the protrusion ratio is between about 0.5 and 1.0. In another embodiment, a cutting element with high diamond content includes a substrate with a protrusion ratio of zero. The substrate is provided with a smooth dome interface surface and no protrusions.

In one embodiment, the protrusions (such as protrusions 12, 12' in FIGS. 5-6) are positioned inwardly on the interface surface of the substrate, away from the circumferential edge of the substrate, toward the center axis of the substrate. As compared to conventional PCD cutting elements formed at standard pressures, the protrusions for the high pressure PCD cutters are located closer to the center axis of the substrate and further from the edge. In one embodiment, the protrusions are located within a diameter that is approximately 90% of the diameter of the substrate, leaving the remaining outer 10% of the diameter proximate the edge free of protrusions. In one embodiment, a substrate with a diameter of 17.8 mm included protrusions that were spaced inwardly from the circumferential edge of the substrate by 2 mm.

Figure 13:
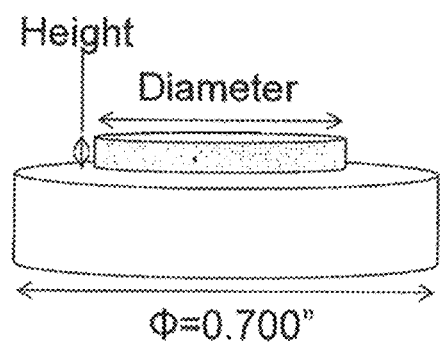
FIG. 13 is a side view of a substrate with a stepped interface surface, according to an embodiment of the present disclosure.

In another embodiment, a substrate with a stepped interface surface is provided, as shown in FIG. 13. The substrate includes an outer diameter of 0.700 inches. A stepped protrusion is provided in the center of the interface surface. The step has a diameter and a height. Four different substrates with varying step dimensions were sintered with a diamond powder mixture at 12.0 ksi to form sintered PCD bodies bonded to the substrates. The sintered PCD bodies were then examined for cracks as before, and the yield was documented, as shown below in Table VIII:

TABLE VIII

| Interface Geometry | Step Diameter (inches) | Step Height (inches) | Yield (number without cracks/total number tested) |
|---|---|---|---|
| B1 | 0.590 | 0.030 | 0% (0/4) |
| B2 | 0.590 | 0.040 | 50% (2/4) |
| B3 | 0.480 | 0.030 | 100% (4/4) |
| B4 | 0.480 | 0.040 | 50% (2/4) |

The above data shows that the B3 geometry, with a smaller step diameter combined with a shorter step height, gave the best yield. In one embodiment, the ratio of step diameter to the substrate outer diameter is less than about 0.7.

One additional geometric variable is the thickness of the PCD layer. A thicker PCD layer (or "table") is likely to have higher residual stresses. Thus, stresses can be reduced by reducing the thickness of the PCD layer. Additionally, for a thicker table, a lower protrusion ratio may reduce stresses. In one embodiment, the thickness of the PCD table is reduced as the diamond content is increased.

Optionally, the PCD diamond body may be bonded to a substrate. In one or more embodiments, the substrate may comprise a metal carbide and a metal binder which has been sintered (also referred to herein as a sintered metal carbide). Suitably, the metal of the metal carbide may be selected from chromium, molybdenum, niobium, tantalum, titanium, tungsten and vanadium and alloys and mixtures thereof. For example, sintered tungsten carbide may be formed by sintering a mixture of stoichiometric tungsten carbide and a metal binder. The substrate may contain metal carbide (e.g., tungsten carbide) in the range of from 75 to 98% by weight, based on the total weight of the substrate, suitably from 80 to 95% by weight, more suitably from 85 to 90% by weight. The amount of metal binder may be in the range of from 5 to 25% weight (% w), based on the total weight of the substrate, in particular from 5 to 15% w, for example 6% w, 8% w, 9% w, 10% w, 11% w, 12% w, 13% w, or 14% w, on the same basis. In one or more embodiments, the amount of metal binder in present in the substrate may be in the range of from 6% w to 9% w, or 9% w to 11% w, based on the total weight of the substrate. A greater amount of metal binder in the substrate may improve fracture toughness of the substrate while a lesser amount of metal binder may improve wear resistance of the substrate, in particular hardness, abrasion resistance, corrosion resistance, and erosion resistance.

In one or more embodiments, the fully sintered substrate may be prepared by combining tungsten carbide, such as a stoichiometric tungsten carbide powder, and a metal binder, such as cobalt. The metal binder may be provided in the form of a separate powder or as a coating on the tungsten carbide. Optionally, a carbonaceous wax and a liquid diluent, such as water or an organic solvent (e.g., an alcohol), may also be included in the mixture. The mixture may then be milled, granulated and pressed into a green compact. The green compact may then be de-waxed and sintered to form the substrate. De-waxing may be conducted under conditions sufficient to remove any diluents and wax material used to form the green compact. Sintering may be conducted under conditions sufficient to form the substrate and may use vacuum sintering, hot-isostatic pressing sintering, microwave sintering, spark plasma sintering, etc. During sintering, temperatures may be in the range of from 1000 to 1600° C., in particular from 1300 to 1550° C., more in particular from 1350 to 1500° C. As discussed above, the sintered substrate may have a planar or non-planar surface.

The particle sizes of the metal carbide used to form the sintered metal carbide may also be varied. The particles of metal carbide may be in the form of non-spherical (crushed) particles or spherical particles (i.e., pellets). The term "spherical", as used herein and throughout the present disclosure, means any particle having a generally spherical shape and may not be true spheres, but lack the corners, sharp edges, and angular projections commonly found in crushed and other non-spherical particles. The term, "non-spherical", as used herein in the present disclosure, means any particle having corners, sharp edges and angular projections commonly found in non-spherical particles. Larger particle sizes of greater than 6 microns, in particular in the range of from 8 to 16 microns may be used. Use of larger particle sizes of the metal carbide may also provide improved fracture toughness. Smaller particle sizes of 6 microns or less, in particular in the range of from 1 micron to 6 microns may also be used. Use of smaller particle sizes of the metal carbide may also provide improved wear resistance of the substrate, in particular improved erosion resistance, and hardness. The particle sizes of the metal carbide may also be multi-modal which may provide substrates and cutter elements with various properties. The metal binder may be selected from Group VIII metals, for example iron, cobalt, nickel, alloys, and mixtures thereof. Suitably, the substrate may be a tungsten carbide sintered with a cobalt binder.

In one or more embodiments, diamond powder containing diamond crystals or grains (natural or synthetic) may be placed into an assembly with a source of catalyst material. The source of catalyst material may be in the form of a powder mixed with the diamond powder or in the form of a coating on the diamond crystals. The amount of catalyst material provided in combination with the diamond crystals (whether in the form of a powder, tape, or other conformable material) may be in an amount of at most 3% w, suitably at most 2% w. Alternatively, or in addition, the source of catalyst material may be in the form of a substrate positioned adjacent the diamond mixture in the assembly.

Alternatively, or in addition, the diamond mixture may be provided in the form of a green-state part comprising diamond crystals and optionally catalyst material contained by a binding agent, e.g., in the form of diamond tape or other formable/conformable diamond product used to facilitate the manufacturing process. When such green-state parts are used to form the PCD body, it may be desirable to preheat before the HPHT consolidation and sintering process. The resulting cutting element contains a PCD body with a material microstructure made of a diamond matrix phase of bonded together diamond crystals, with catalyst material from the substrate disposed within interstitial regions that exist between the bonded diamond crystals. When the source of catalyst material may come from two or more sources, such as a powder in the diamond mixture and a metal binder in the substrate, the catalyst material from each source may be the same or different. When the catalyst material infiltrates from the substrate into the PCD body, the metal binder in the substrate has a dominant effect on the metal composition in the interstitial regions of the PCD body.

In one or more embodiments, the cutting element may be formed by utilizing a partially densified substrate. As used herein, fully densified is understood to mean tungsten carbide particles infiltrated with a metal binder which have zero or no porosity. Partially densified substrates are described in US 2004/0141865 A1, and such description is incorporated herein by reference. A mixture comprising diamond crystals, as discussed above, may be placed in contact with the surface of the partially densified substrate and subjected to a high pressure, high temperature (HPHT) sintering process to form the PCD body bonded to the substrate.

In one or more embodiments, the cutting element may be formed by utilizing pre-cemented tungsten carbide granules and forming the substrate in-situ during the HPHT process. The pre-cemented tungsten carbide granules and diamond mixture, as discussed above, may be placed in contact within an assembly and subjected to a HPHT sintering process.

In another embodiment, a PCD cutting element has a substrate with a reduced coefficient of thermal expansion. This can be accomplished by reducing the cobalt content of the substrate. In one embodiment, the cobalt content of the substrate (prior to sintering) is within the range of approximately 6% to 13% by weight. In another embodiment, the cobalt content of the substrate is less than about 11% by weight, and in another embodiment within the range of approximately 9% to 11% by weight. This modification brings the coefficients of thermal expansion of the substrate and the high diamond content PCD layer closer to each other, which reduces the thermal stresses at the interface. In one embodiment, a PCD cutting element includes a substrate with a reduced cobalt content, and a PCD body with a treated first region. The first region may extend into the PCD body from a cutting surface to a depth of no more than 100 microns, or in another embodiment a depth in the range of 100 microns to less than 300 microns, or in another embodiment a depth of at least 300 microns.

Figure 8:
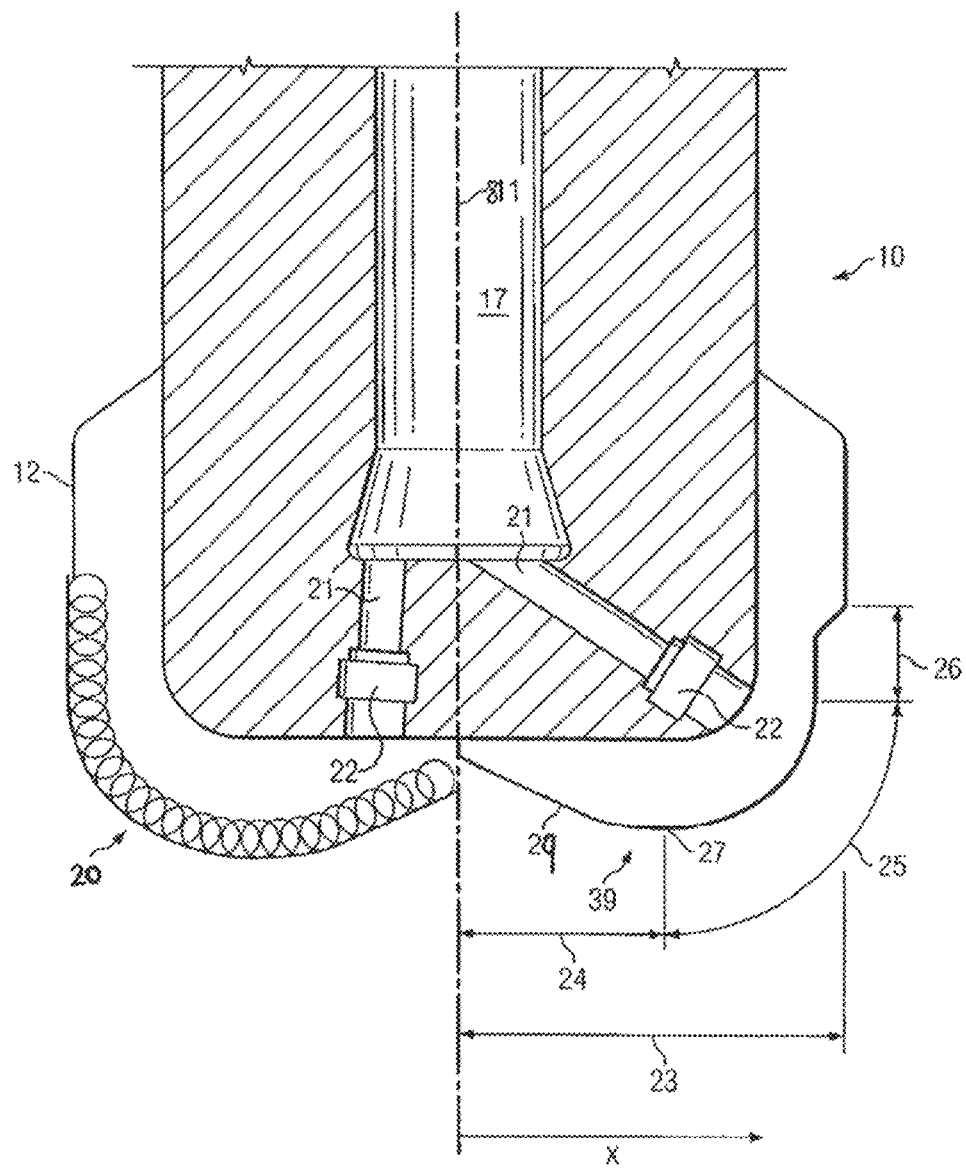
FIG. 8 is a partial cross-sectional view of a drill bit incorporating a plurality of cutting elements, according to an embodiment of the present disclosure.

The high diamond content PCD bodies disclosed above may be formed as a cutting element for incorporation into a downhole tool such as a drill bit. Referring again to FIG. 1 and FIG. 8, the bit body 12 of the drill bit 10 may include a central longitudinal bore 17 permitting drilling fluid to flow from the drill string into the bit body 12. Bit body 12 is also provided with downwardly extending flow passages 21 having ports or nozzles 22 disposed at their lowermost ends. The flow passages 21 are in fluid communication with central bore 17. Together, passages 21 and nozzles 22 serve to distribute drilling fluids around a cutting element to flush away formation cuttings during drilling and to remove heat from the bit 10. FIG. 8 is an exemplary profile of a fixed cutter rotary bit 10 shown as it would appear with all blades and all cutting elements rotated into a single rotated profile. Bit 10 contains three primary blades and three secondary blades.

Still referring to FIG. 8, primary blades and secondary blades are integrally formed as part of, and extend from, bit body 12. Primary blades and secondary blades extend radially across bit face 29 and longitudinally along a portion of the periphery of bit 10. Primary blades extend radially from substantially proximal central axis 811 toward the periphery of bit 10. Thus, as used herein, the term "primary blade" is used to describe a blade that extends from substantially proximal central axis 811. Secondary blades do not extend from substantially proximal central axis 811. Thus, as used herein, the term "secondary blade" is used to describe a blade that does not extend from substantially proximal central axis 811. Primary blades and secondary blades are separated by drilling fluid flow courses 19 (see FIG. 1).

In one or more embodiments, one or more of the primary blades and/or one or more of the secondary blades may have one or more back-up cutting elements positioned thereon. Primary cutter elements are positioned adjacent one another generally in a first row extending radially along each primary blade and optionally along each secondary blade. Further, back-up cutting elements may be positioned adjacent one another generally in a second row extending radially along each primary blade, for example in the shoulder region. Suitably, the back-up cutting elements may form a second row that may extend along each primary blade in the shoulder region, cone region and/or gage region, for example in the shoulder region. In one or more embodiments, back-up cutting elements may be provided in more than one row on a blade.

As used herein, the term "back-up cutting elements" is used to describe a cutting element that trails any other cutting element on the same blade (primary or secondary) when bit 10 is rotated in the cutting direction. Further, as used herein, the term "primary cutting element" is used to describe a cutting element provided on the leading edge of a blade (primary or secondary). In other words, when bit 10 is rotated about central axis 811 in the cutting direction, a primary cutting element does not trail any other cutting elements on the same blade.

Suitably, each primary cutting element and optional back-up cutting elements may have any suitable size and geometry. Primary cutting elements and back-up cutting elements may have any suitable location and orientation. In an example embodiment, back-up cutting elements may be located at the same radial position (within standard manufacturing tolerances) as the primary cutting element it trails, or back-up cutting elements may be offset from the primary cutting element it trails, or combinations thereof may be used. The primary and back-up cutting elements may be "on-profile" or "off-profile" or combinations thereof. As used herein, the term "off-profile" may be used to refer to a cutting element that has an extension height less than the extension height of one or more other cutting elements. As used herein, the term "on-profile" may be used to refer to a cutting element that has an extension height that defines the outermost cutting profile of the drill.

Referring to FIG. 8, blade profiles 39 and bit face 29 may be divided into three different regions: cone region 24, shoulder region 25, and gage region 26. Cone region 24 is concave in this example embodiment and comprises the inner most region of bit 10 (e.g., cone region 24 is the central most region of bit 10). Adjacent cone region 24 is shoulder (or the upturned curve) region 25. Next to shoulder region 25 is the gage region 26 which is the portion of the bit face 29 which defines the outer radius 23 of the bit 10. Outer radius 23 extends to and therefore defines the full diameter of bit 10. As used herein, the term "full gage diameter" is used to describe elements or surfaces extending to the full, nominal gage of the bit diameter.

Still referring to FIG. 8, cone region 24 is defined by a radial distance along the x-axis measured from central axis 811. It is to be understood that the x-axis is perpendicular to the central axis 811 and extends radially outward from central axis 811. Cone region 24 may be defined by a percentage of the outer radius 23 of bit 10. In one or more embodiments, cone region 24 extends from central axis 811 to no more than 50% of outer radius 23. In one or more embodiments, cone region 24 extends from central axis 811 to no more than 30% of the outer radius 23. Cone region 24 may likewise be defined by the location of one or more secondary blades. For example, cone region 24 extends from central axis 811 to a distance at which a secondary blade begins. In other words, the outer boundary of cone region 24 may coincide with the distance at which one or more secondary blades begin. The actual radius of cone region 24, measured from central axis 811 may vary from bit to bit depending on a variety of factors including without limitation, bit geometry, bit type, location of one or more secondary blades, or combinations thereof. For instance, in some cases bit 10 may have a relatively flat parabolic profile resulting in a cone region 24 that is relatively large (e.g., 50% of outer radius 23). However, in other cases, bit 10 may have a relatively long parabolic profile resulting in a relatively smaller cone region 24 (e.g., 30% of outer radius 23). Adjacent the cone region 24 is the shoulder (or the upturned curve) region 25. In this embodiment, shoulder region 25 is generally convex. The transition between cone region 24 and shoulder region 25 occurs at the axially outermost portion of composite blade profile 39 (lowermost point on bit 10 in FIG. 8), which is typically referred to as the nose or nose region 27. Next to the shoulder region 25 is the gage region 26 which extends substantially parallel to central axis 811 at the outer radial periphery of composite blade profile 39.

In one or more embodiments, one or more cutting elements of the present disclosure (first cutting elements) may be positioned on the bit alone or in combination with one or more second cutting elements which are different (i.e., not in accordance with the cutting elements of the present disclosure). The cutting elements of the present disclosure may be positioned in one or more areas of the drill bit which will benefit the most from the improved properties/performance of such cutting elements. Such areas of the drill bit may include the nose region, shoulder region and/or gage region of the drill bit. In one or more embodiments, the cutting elements of the present disclosure may be positioned on the drill bit as primary cutting elements in the nose, shoulder and/or gage regions while the second cutting elements may be positioned on the drill bit as back-up cutting elements in these regions as well as primary cutting elements in the cone region. In one or more embodiments, the cutting elements of the present disclosure may be positioned on the drill bit as primary cutting elements and as back-up cutting elements in the nose, shoulder and/or gage regions of the drill bit while the second cutting elements may be positioned as primary cutting elements in the cone region.

Such cutting elements as described herein may be used in any number of applications for example downhole tools such as reamers, bi-center bits, hybrid bits, impregnated bits, roller cone bits, milling bits, as well as other downhole cutting tools.

In one or more embodiments, prior to removal of the catalyst material from the interstitial regions of the PCD body, the PCD body may have a dry vertical turret lathe (VTL) cutting distance of at least 5,500 feet (1,675 meters), for example at least 7,500 feet (2,285 meters), at least 10,000 feet (3,050 meters), at least 11,000 feet (3,350 meters), at least 12,000 feet (3,655 meters), at least 13,000 feet (3,960 meters), at least 14,000 feet (4,265 meters), or at least 15,000 feet (4,570 meters) in other embodiments.

The VTL cutting distance is measured by the following VTL test method. A Barre granite rock sample is used to measure the VTL cutting distance. The rock sample having an outer diameter of 36 inches (914 mm) and an inner diameter of 12 inches (305 mm) is mounted on a vertical turret lathe to present a rotating surface of rock to the cutting element. A 16 mm diameter cutting element is mounted with a negative back rake such that the central axis of the cutting element forms a 20° angle with a line normal to the surface of the rock sample. A 45° chamfer is employed on the cutting edge of the PCD body of the cutting element. The chamfer has a width of 0.012 inches (0.3 mm). The vertical turret lathe is adjusted to advance the cutting element radially toward the center of the rock sample as the rock sample is rotated below the cutting element to produce a spiral kerf in the granite table extending from the outer edge of the rock sample to the center. The vertical turret lathe is operated under conditions sufficient to provide a cutting feed rate of 0.02 inches/revolution (0.5 mm/rev). The surface speed of the cutting element over the rock sample is 350 feet/minute (107 meters/min). The depth of cut (Z direction) is 0.08 inches (2 mm). The test is conducted under dry conditions, i.e., no coolant is used during the test. The measured VTL cutting distance is the distance of rock cut up to the point in time of cutter failure, i.e., no more rock is cut with the cutting element being tested. Typically, cutter failure is indicated by light being emitted by the cutting element and/or graphitization of the cutting element leaving a black mark on the rock sample. The VTL test is conducted on the PCD sample prior to leaching (if any). The VTL cutting distances given above identify the tested PCD sample as a sample with high diamond content.

The various embodiments described above may be used independently or may be used together; for example, a PCD body may have a bilayer construction and/or the coefficient of the substrate may be reduced and/or the substrate geometry may be modified to be less aggressive and/or leached to a depth of at least 300 microns. PCD cutting elements with some or all of the features described above are most useful for sintered diamond grain sizes approximately 20 micron or less, as diamond grains greater than 20 micron typically do not have the necessary wear resistance for shear cutter applications. In one embodiment, the diamond grain size is approximately 15 micron or less. Embodiments of the present disclosure may be practiced with larger grain sizes as well.

High diamond content cutting elements of the present disclosure can drill through an earthen formation for longer periods of time and/or at higher speeds, higher weight on bit (WOB), and/or higher rates of penetration (ROP) than cutting elements known heretofore. The cutting elements of the present disclosure can drill through highly abrasive earthen formations (e.g., sandstones and geothermal applications) which were not amenable to drilling with fixed cutter drill bits heretofore. The enhanced treatment of the PCD microstructure resulting from the use of ultra high pressures when forming the PCD body can result in improved strength (e.g., transverse rupture strength), impact resistance, toughness, thermal stability, wear resistance, and/or reduced cracking as compared to cutting elements prepared using similar compositions but lower processing pressures and/or shallower treatment depths.

In particular, leached PCD cutting elements with high diamond content may show an improvement in transverse rupture strength compared to leached cutting elements formed at standard pressures. In conventional cutting elements, leaching the PCD body to remove the catalyst metal from the interstitial regions can reduce the strength of the PCD body. Thus leached conventional PCD cutters have reduced strength compared to unleached conventional PCD cutters. With high diamond content cutters according to the present disclosure, the loss in strength that accompanies the leaching process is less significant; that is, the difference in strength between leached and unleached cutters is lower with the high pressure, high diamond content cutters. In one embodiment, the inventors have observed this improvement in strength for high pressure PCD cutters formed with fine diamond grains (sintered average grain size below 10 microns).

While the present disclosure has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A cutting element comprising:
   a substrate comprising a substrate interface surface, the substrate interface surface comprising a protrusion; and
   a polycrystalline diamond body comprising,
      a diamond interface surface interfacing with the substrate interface surface,
      a top surface opposite the diamond interface surface,
      a cutting edge meeting the top surface, and
      a material microstructure comprising a plurality of bonded-together diamond grains having an average grain size and interstitial regions between the diamond grains;
   wherein at least a region of the polycrystalline diamond body has the following properties:
      a diamond volume fraction, as measured by electron backscatter diffraction, greater than $(0.9077) \cdot (\text{the diamond average grain size}^{\wedge}0.0221)$, with the diamond average grain size provided in microns, and
      the diamond average grain size is not greater than 8 microns.

2. The cutting element as recited in claim 1 wherein the substrate interface surface comprises an annular surface portion and wherein the protrusion is a step protrusion and comprises a diameter and a height as measured from the annular surface portion.

3. The cutting element as recited in claim 2 wherein the substrate comprises a diameter and wherein the diameter of the protrusion is less than about 0.7 times the diameter of the substrate.

4. The cutting element as recited in claim 2 wherein the substrate comprises a diameter and wherein the diameter of the protrusion is less than the diameter of the substrate but greater than half the diameter of the substrate.

5. The cutting element as recited in claim 2 wherein the ratio of the height to the diameter of the protrusion is less than about 0.1.

6. The cutting element as recited in claim 1 wherein the at least a region comprises a plurality of the interstitial regions that are substantially free of a catalyst material, and the at least a region extends from the cutting edge to a depth of at least 300 microns.

7. The cutting element as recited in claim 1 wherein the at least a region comprises a plurality of the interstitial regions that are substantially free of a catalyst material, and wherein the at least a region extends from the cutting edge to a depth of at least 500 microns.

8. The cutting element as recited in claim 1 wherein the at least a region has the following property:

the diamond volume fraction is greater than (0.9187)·(the average grain size ^ 0.0183).

9. The cutting element as recited in claim 1 wherein the at least a region has the following property:
the diamond volume fraction is greater than (0.9291)·(the average grain size ^ 0.0148).

10. The cutting element as recited in claim 1, wherein the diamond average grain size is not greater than 6 microns.

11. A drill bit comprising a bit body and at least one cutting element as recited in claim 1 disposed on the bit body.

12. A cutting element comprising:
a substrate comprising a substrate interface surface, the substrate interface surface comprising a protrusion; and
a polycrystalline diamond body formed by sintering at a cold cell pressure greater than 5.4 GPa, the polycrystalline diamond body comprising,
a diamond interface surface interfacing with the substrate interface surface,
a top surface opposite the diamond interface surface;
a cutting edge meeting the top surface; and
a material microstructure comprising a plurality of bonded-together diamond grains having an average grain size and interstitial regions between the diamond grains;
wherein at least a region of the polycrystalline diamond body satisfies one of the following conditions:
an average grain size within the range of 2-4 microns, and a diamond volume fraction greater than 93%, or
an average grain size within the range of 4-6 microns, and a diamond volume fraction greater than 94%, or
an average grain size within the range of 6-8 microns, and a diamond volume fraction greater than 95%, and
wherein the diamond volume fraction is that which is determined by electron backscatter diffraction.

13. The cutting element as recited in claim 12 wherein the substrate interface surface comprises an annular surface portion and wherein the protrusion is a step protrusion and comprises a diameter and a height as measured from the annular surface portion.

14. The cutting element as recited in claim 13 wherein the substrate comprises a diameter and wherein the diameter of the protrusion is less than about 0.7 times the diameter of the substrate.

15. The cutting element as recited in claim 13 wherein the substrate comprises a diameter and wherein the diameter of the protrusion is less than the diameter of the substrate but greater than half the diameter of the substrate.

16. The cutting element as recited in claim 13 wherein the ratio of the height to the diameter of the protrusion is less than about 0.1.

17. The cutting element as recited in claim 12 wherein the at least a region comprises a plurality of the interstitial regions that are substantially free of a catalyst material, and wherein the at least a region extends from the cutting edge to a depth of at least 300 microns.

18. The cutting element as recited in claim 12 wherein the at least a region comprises a plurality of the interstitial regions that are substantially free of a catalyst material, and wherein the at least a region extends from the cutting edge to a depth of at least 500 microns.

19. A drill comprising a bit body and at least one cutting element as recited in claim 12 disposed on the bit body.

* * * * *